United States Patent
Wang et al.

(10) Patent No.: US 8,929,887 B2
(45) Date of Patent: Jan. 6, 2015

(54) SHARED BOOK READING

(75) Inventors: Winston Wang, Seattle, WA (US);
Michael Kemery, Seattle, WA (US);
Marianna Wickman, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 211 days.

(21) Appl. No.: 12/731,717

(22) Filed: Mar. 25, 2010

(65) Prior Publication Data

US 2011/0045816 A1 Feb. 24, 2011

Related U.S. Application Data

(63) Continuation-in-part of application No. 12/544,404, filed on Aug. 20, 2009.

(51) Int. Cl.
*H04W 4/00* (2009.01)
*G06F 3/147* (2006.01)
*G06F 3/14* (2006.01)
*G06F 3/038* (2013.01)

(52) U.S. Cl.
CPC ............... *G06F 3/038* (2013.01); *G06F 3/147* (2013.01); *G09G 2380/14* (2013.01); *G09G 2370/027* (2013.01); *G06F 3/1454* (2013.01)
USPC .......................... 455/428; 370/338; 348/14.07

(58) Field of Classification Search
USPC ............... 455/428; 370/338; 348/14.01–14.08
See application file for complete search history.

(56) References Cited

U.S. PATENT DOCUMENTS

| | | | |
|---|---|---|---|
| 5,023,907 A | 6/1991 | Johnson et al. | |
| 6,767,212 B2 | 7/2004 | Thomas | |
| 6,889,212 B1 | 5/2005 | Wang et al. | |
| 7,046,139 B2 | 5/2006 | Kuhn et al. | |
| 7,113,981 B2 | 9/2006 | Slate | |
| 7,218,912 B2 | 5/2007 | Erskine et al. | |
| 7,302,272 B2 | 11/2007 | Ackley | |
| 7,415,711 B2 | 8/2008 | Chew et al. | |
| 2001/0018660 A1 | 8/2001 | Sehr | |
| 2002/0099552 A1* | 7/2002 | Rubin et al. | .................. 704/270 |
| 2002/0156792 A1 | 10/2002 | Gombocz et al. | |
| 2003/0078036 A1 | 4/2003 | Chang et al. | |
| 2004/0166878 A1 | 8/2004 | Erskine et al. | |
| 2004/0180648 A1 | 9/2004 | Hymel et al. | |
| 2004/0235520 A1 | 11/2004 | Cadiz et al. | |
| 2005/0096009 A1 | 5/2005 | Ackley | |
| 2005/0125819 A1 | 6/2005 | Ono et al. | |

(Continued)

FOREIGN PATENT DOCUMENTS

| | | |
|---|---|---|
| KR | 20010096407 | 11/2001 |
| KR | 20020066804 | 8/2002 |

(Continued)

OTHER PUBLICATIONS

Final Office Action for U.S. Appl. No. 12/544,464, mailed on Jun. 1, 2011, Michael Kernery, "Licensed Content Purchasing and Delivering".

(Continued)

*Primary Examiner* — Marcos Batista
(74) *Attorney, Agent, or Firm* — Lee & Hayes, PLLC

(57) ABSTRACT

Techniques for sharing book reading experiences between users of different telecommunications devices are described herein.

17 Claims, 28 Drawing Sheets

(56) References Cited

U.S. PATENT DOCUMENTS

| | | | |
|---|---|---|---|
| 2005/0278637 A1* | 12/2005 | Youm et al. | 715/730 |
| 2006/0101499 A1 | 5/2006 | Aravamudan et al. | |
| 2006/0121428 A1 | 6/2006 | Terrazas | |
| 2006/0122938 A1 | 6/2006 | Hicks et al. | |
| 2006/0143047 A1 | 6/2006 | Briegs et al. | |
| 2006/0143622 A1 | 6/2006 | Prabandham et al. | |
| 2006/0189348 A1 | 8/2006 | Montulli et al. | |
| 2006/0194181 A1* | 8/2006 | Rosenberg | 434/317 |
| 2006/0224943 A1 | 10/2006 | Snyder et al. | |
| 2006/0242242 A1 | 10/2006 | Ezumi et al. | |
| 2006/0255119 A1 | 11/2006 | Marchasin et al. | |
| 2006/0258341 A1 | 11/2006 | Miller et al. | |
| 2006/0270395 A1 | 11/2006 | Dhawan et al. | |
| 2007/0006327 A1 | 1/2007 | Lal et al. | |
| 2007/0021145 A1 | 1/2007 | Lam | |
| 2007/0037562 A1 | 2/2007 | Smith-Kerker et al. | |
| 2007/0037563 A1 | 2/2007 | Yang et al. | |
| 2007/0039025 A1 | 2/2007 | Kraft et al. | |
| 2007/0058637 A1 | 3/2007 | Lo | |
| 2007/0070404 A1 | 3/2007 | Caradec et al. | |
| 2007/0081075 A1* | 4/2007 | Canova et al. | 348/14.08 |
| 2007/0099609 A1 | 5/2007 | Cai | |
| 2007/0127633 A1* | 6/2007 | Hertel et al. | 379/67.1 |
| 2007/0198413 A1 | 8/2007 | Nagao | |
| 2007/0250382 A1 | 10/2007 | Beck | |
| 2008/0064381 A1 | 3/2008 | Ackley | |
| 2008/0070608 A1 | 3/2008 | Ackley | |
| 2008/0070609 A1 | 3/2008 | Ackley | |
| 2008/0096544 A1 | 4/2008 | McNamara et al. | |
| 2008/0096603 A1 | 4/2008 | Sparre | |
| 2008/0140433 A1 | 6/2008 | Levy et al. | |
| 2008/0162305 A1 | 7/2008 | Rousso et al. | |
| 2008/0181201 A1 | 7/2008 | Park et al. | |
| 2008/0209577 A1 | 8/2008 | Vrielink et al. | |
| 2008/0215494 A1 | 9/2008 | Corbett | |
| 2008/0233944 A1 | 9/2008 | Tu | |
| 2008/0246605 A1 | 10/2008 | Pfeffer et al. | |
| 2008/0256641 A1 | 10/2008 | Lo | |
| 2008/0288966 A1 | 11/2008 | Maes | |
| 2008/0299527 A1 | 12/2008 | Groot et al. | |
| 2008/0307324 A1 | 12/2008 | Westen et al. | |
| 2009/0005000 A1 | 1/2009 | Baker et al. | |
| 2009/0006116 A1 | 1/2009 | Baker et al. | |
| 2009/0006200 A1 | 1/2009 | Baker et al. | |
| 2009/0015653 A1 | 1/2009 | Baek | |
| 2009/0018963 A1 | 1/2009 | Abu-Amara | |
| 2009/0038005 A1 | 2/2009 | Howarth | |
| 2009/0054092 A1 | 2/2009 | Stonefield et al. | |
| 2009/0069084 A1 | 3/2009 | Reece et al. | |
| 2009/0106110 A1 | 4/2009 | Stannard et al. | |
| 2009/0143007 A1 | 6/2009 | Terlizzi | |
| 2009/0148824 A1 | 6/2009 | Argott | |
| 2009/0149205 A1 | 6/2009 | Heredia et al. | |
| 2009/0199178 A1 | 8/2009 | Keller et al. | |
| 2009/0209240 A1 | 8/2009 | Mahowald | |
| 2009/0225788 A1 | 9/2009 | Kephart et al. | |
| 2009/0254656 A1 | 10/2009 | Vignisson et al. | |
| 2009/0282005 A1 | 11/2009 | Kim et al. | |
| 2009/0317778 A1* | 12/2009 | Oberman | 434/169 |
| 2010/0039254 A1 | 2/2010 | Cooper et al. | |
| 2010/0122170 A1* | 5/2010 | Girsch et al. | 715/727 |
| 2010/0235476 A1 | 9/2010 | Lin et al. | |
| 2010/0241530 A1 | 9/2010 | Murset | |
| 2010/0299712 A1 | 11/2010 | Austin et al. | |
| 2010/0322234 A1 | 12/2010 | Kodaka | |
| 2011/0044438 A1 | 2/2011 | Wang et al. | |
| 2011/0065419 A1 | 3/2011 | Book et al. | |
| 2011/0202863 A1 | 8/2011 | Corrallo | |
| 2012/0066088 A1 | 3/2012 | Murset | |
| 2014/0112458 A1 | 4/2014 | Wang et al. | |

FOREIGN PATENT DOCUMENTS

| | | | |
|---|---|---|---|
| KR | 20060108093 A | 10/2006 | |
| KR | 20070005163 A | 1/2007 | |
| KR | 20070017229 A | 2/2007 | |
| WO | WO2010008509 A2 | 1/2010 | |

OTHER PUBLICATIONS

PCT Search Report & Written Opinion mailed Jun. 27, 2011 for PCT Application No. PCT/US10/45996.

PCT International Search Report and Written Opinion mailed Mar. 29, 2011 for PCT Application No. PCT/US10/45991, 10 pgs.

PCT International Search Report and Written Opinion mailed Apr. 15, 2011 for PCT Application No. PCT/US10/45722, 10 pgs.

"AT&T Video Share Lets Wireless Customers Share Live Video", retrieved from <<http://www.att.com/gen/press-room?pid=9199>> on Feb. 26, 2009, 2 pages.

"Back to MediaCast FAQ", retrieved from <<http://vumenow.com/support mediashare.php?faq=1>> on Feb. 26, 2009, 2 pages.

Beck, "An Allowance That's Measured in Minutes, Not Cents," retrieved at <<http://www.nytimes.com/2007/11/25/business/yourmoney/25allowance.html?_r=2&pagewanted=print>>, Nov 25, 2007, 3 pgs.

"Cingular to roll out video/chat service", The Seattle Times: Tech Tracks, retrieved from <<http://blog.seattletimes.nwsource.com/techtracks/archives/2006/06/cingular_to_roll_out_videochat_service_1.html>>, Jun. 28, 2006, 2 pages.

GSM Association, "Image Share Interoperability Specification 1.1", Official Document IR.79, Apr. 10, 2008, 13 pages.

GSM Association, "Video Share Interoperability Specification 1.3", Official Document IR.74, Oct. 30, 2008, 18 pages.

"My Reward Board," retrieved at <<http://www.myrewardboard.com/>> on Mar. 24, 2010, available as early as Jan. 25, 2010, 1 pg.

Raffle, et al., "Family Story Play: Reading with Young Children (and Elmo) Over a Distance", CHI 2010, Apr. 10-15, 2010, Atlanta, Georgia, 10 pages.

Yarosh et al. , "Developing a Media Space for Remote Synchronous Parent Child Interaction", IDC 2009, Jun. 3-5, 2009, Como, Italy, 10 pages.

Oomble.com, "Frequently Asked Questions", Last Revised Aug. 22, 2007, Retrieved from http//web.archive.org/web/20080122014735/www.oomble.com/public/faq.jsp on Jan. 18, 2011, 12 pages.

Office Action for U.S. Appl. No. 12/544,881, mailed on Sep. 6, 2011, Kemery et al., "Parent Telecommunication Device Configuration of Activity-Based Child Telecommunication Device", 15 pages.

PCT Search Report & Written Opinion mailed Oct. 27, 2011 for PCT Application No. PCT/US11/28527, 11 pages.

PCT Search Report & Written Opinion mailed Oct. 31, 2011 for PCT Application No. PCT/US11/28545, 8 pages.

PCT Search Report & Written Opinion mailed Nov. 30, 2011 for PCT Application No. PCT/US11/28371, 10 pages.

Office Action for U.S. Appl. No. 12/544,881, mailed on Apr. 11, 2012, Kemery, "Parent Telecommunication Device Configuration of Activity-Based Child Telecommunication Device", 17 pages.

Non-Final Office Action for U.S. Appl. No. 12/732,103, mailed on Apr. 11, 2012, Marianna Wickman, et al., "Parent-Controlled Episodic Content on a Child Telecommunication Device", 10 pages.

Non-Final Office Action for U.S. Appl. No. 12/544,404, mailed on Apr. 26, 2012, Winston Wang et al, "Shareable Applications on Telecommunications Devices", 10 pages.

Final Office Action for U.S. Appl. No. 12/731,698, mailed on Jan. 23, 2013, Michael Kemery et al., "Chore and Rewards Tracker", 8 pages.

Non-Final Office Action for U.S. Appl. No. 12/544,464, mailed on Mar. 27, 2013, Michael Kernery, "Licensed Content Purchasing and Delivering", 11 pages.

Final Office Action for U.S. Appl. No. 12/544,464, mailed on May 23, 2013, Michael Kernery, "Licensed Content Purchasing and Delivering", 12 pages.

Final Office Action for U.S. Appl. No. 12/544,404, mailed on Oct. 19, 2012, Winston Wang et al, "Shareable Applications on Telecommunications Devices", 7 pages.

(56) References Cited

OTHER PUBLICATIONS

Final Office Action for U.S. Appl. No. 12/732,103, mailed on Aug. 23, 2012, Marianna Wickman, et al., "Parent-Controlled Episodic Content on a Child Telecommunication Device", 13 pages.

Non-Final Office Action for U.S. Appl. No. 12/731,698, mailed on Aug. 30, 2012, Michael Kemery et al., "Chore and Rewards Tracker", 7 pages.

Office Action for U.S. Appl. No. 12/544,464, mailed on Nov. 1, 2013, Michael Kemery, "Licensed Content Purchasing and Delivering", 13 pages.

Office action for U.S. Appl. No. 12/732,103, mailed on Sep. 9, 2013, Wickman et al., "Parent-Controlled Episodic Content on a Child Telecommunication Device", 16 pages.

Office Action for U.S. Appl. No. 12/544,881, mailed on Sep. 30, 2013, Michael Kemery, "Parent Telecommunication Device Configuration of Activity-Based Child Telecommunication Device", 19 pages.

Office Action for U.S. Appl. No. 14/139,709, mailed On Nov. 3, 2014, Winston Wang, "Shareable Applications on Telecommunications Devices", 6 pages.

* cited by examiner

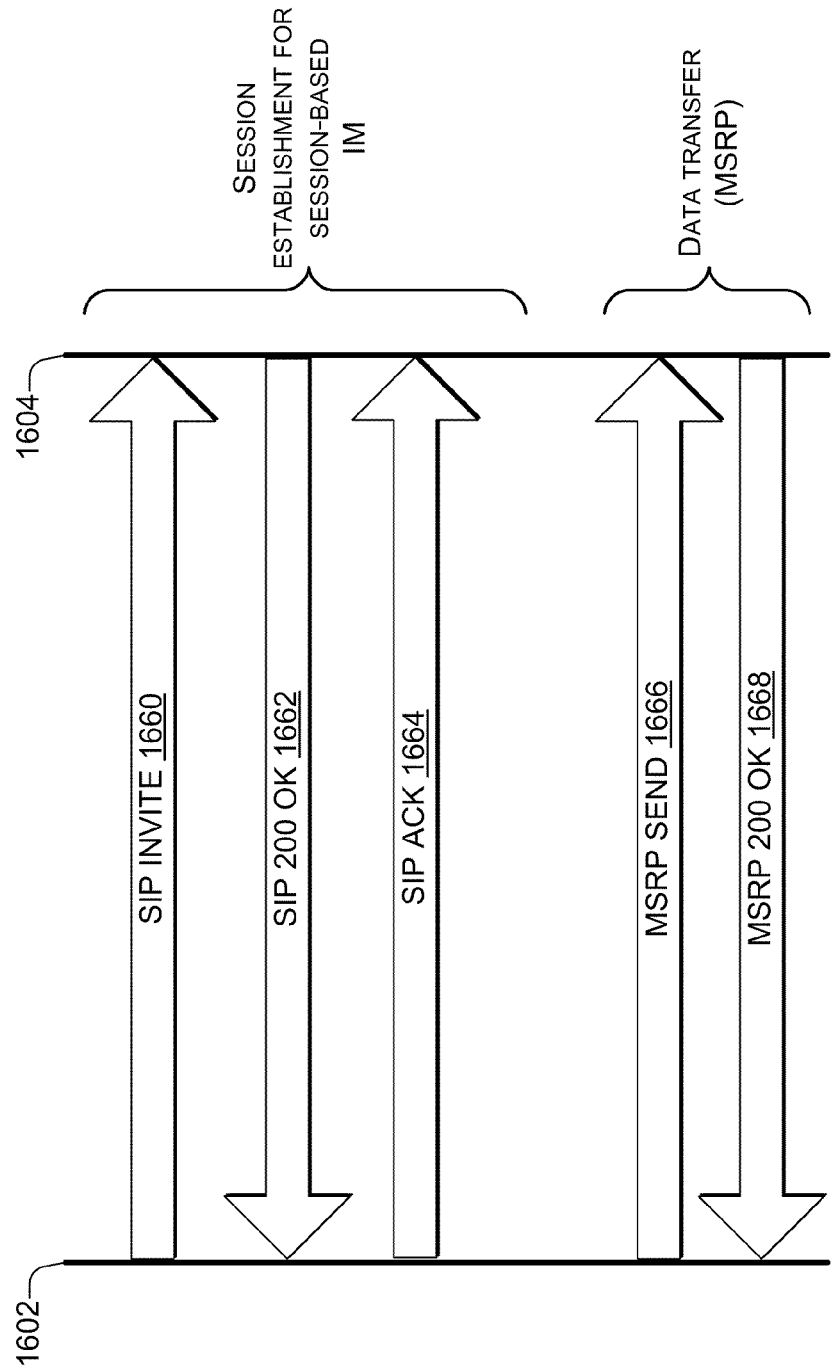

SHARED BOOK READING

PRIORITY CLAIMS

This application is a continuation-in-part of U.S. patent application Ser. No. 12/544,404 filed on Aug. 20, 2009 and entitled Shareable Applications on Telecommunications Devices.

BACKGROUND

In the last few years telecommunications devices such as cellular phones, landline phones and IP-based phones have become more and more capable, offering an increasing array of functions. Once limited to simple point-to-point voice communications, telecommunications devices have evolved into so-called "smart phones" that offer many different modes of telecommunication, such as voice, video, text messaging, instant messaging, email, and other modes of communication. Furthermore, modern smart phones have capabilities approaching those of more traditional desktop computers, including the ability to load and run third party applications. Applications are available for business use, as well as for personal use, education, and entertainment.

Many people view their telecommunications devices as critical to daily life: necessary for coordinating both business and personal activities. Among many families, cell phones, in particular, are becoming a primary means of communication, and more and more children have their own mobile telecommunications devices. This allows parents to keep in touch with their children despite the hectic schedules of both parents and children.

Telecommunications devices now consist of a myriad of form factors, such as traditional landline phones, cordless phones, cellular phones, smart phones, PDA phones, desktop and portable computers, media players, home telecommunications hubs, or the like (hereinafter "telecommunications devices"), which have become a ubiquitous part of modern life. Originally, most of these telecommunications devices just provided two-way voice communication between a first person at a first location using a first telecommunications device and a second person at a second location using a second telecommunications device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunications devices are frequently capable of both voice and data communications, using various modes of such communications. In addition to person-to-person communications, many modern telecommunications devices are capable of other types of data communications through access to the Internet and other databases. For example, many telecommunications devices have built-in web browsers for Internet navigation.

Furthermore, many network service providers or telecommunications device manufacturers now provide a website or "store" from which users may purchase various applications (i.e., an "app store") to add various capabilities to their telecommunications devices. These network service providers or manufacturers also enable third parties to create third party applications that can be downloaded and used on the telecommunications devices. For example, an app store might make available for download a large number of applications written by third parties, in addition to applications provided by the network service provider or by the telecommunications device manufacturer. The third party applications and service provider/manufacturer applications might typically be marketed for a specified download fee, and may be purchased from the app store through the Internet or over the network service provider's own network. By picking and choosing which applications to download to a particular telecommunications device, the telecommunications device owner can decide which corresponding capabilities the particular telecommunications device will be endowed with. Further, word-of-mouth or viral marketing can contribute greatly to the sales success of particular applications. For example, a particular user might show an application on her telecommunications device to her friends, who will then purchase the application for use on their own telecommunications devices. In some cases, the application might be transferred to the telecommunications devices for a free trial and the users are then given an option to purchase the application.

Some applications are able to function while a user of a telecommunications device is carrying on a conversation on the telecommunications device. For example, a user may have a headset or speakerphone feature enabled so that the user is able to view the display of the telecommunications device while talking on the telecommunications device. Thus, the user is then able to view a user interface presented by an application while carrying on a conversation. For instance, during a voice call, the user of the telecommunications device may initiate a personal information manager (PIM) application on the telecommunications device for accessing a phone number of a third party to read the third party's phone number to the person on the other end the call. Thus, while telecommunications devices currently provide a multitude of features, the ever-increasing popularity of telecommunications devices makes it desirable to develop new types of uses, applications and features.

SUMMARY

This document describes a technology to share book reading experiences between users of different telecommunication devices. A user's reading experiences include his or her reading of a displayed electronic book and his or her navigational inputs on the telecommunication device. The technology associates the reading with the navigational inputs, and either transmits such voice and data to a recipient's telecommunication device in real time or records such voice and data for later transmission. The technology enables the recipient to navigate the electronic book and listen to the readings in accordance with the received navigational inputs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 16D illustrates another exemplary implementation of establishing a connection for a shareable application.

DETAILED DESCRIPTION

Overview

Some implementations disclosed herein provide a shared book reading experience, in which an electronic book is displayed concurrently on a parent telecommunications device and a child telecommunications device during a voice call between the parent telecommunications device and the child telecommunications device. As the parent reads the electronic book to the child aloud over the voice call, the parent also navigates or otherwise interacts with the electronic book. Navigational inputs received from the parent are transmitted to the child telecommunications device, and the child telecommunications device navigates the electronic book in accordance with the received navigational input.

Exemplary Communication Environment

Figure 1:
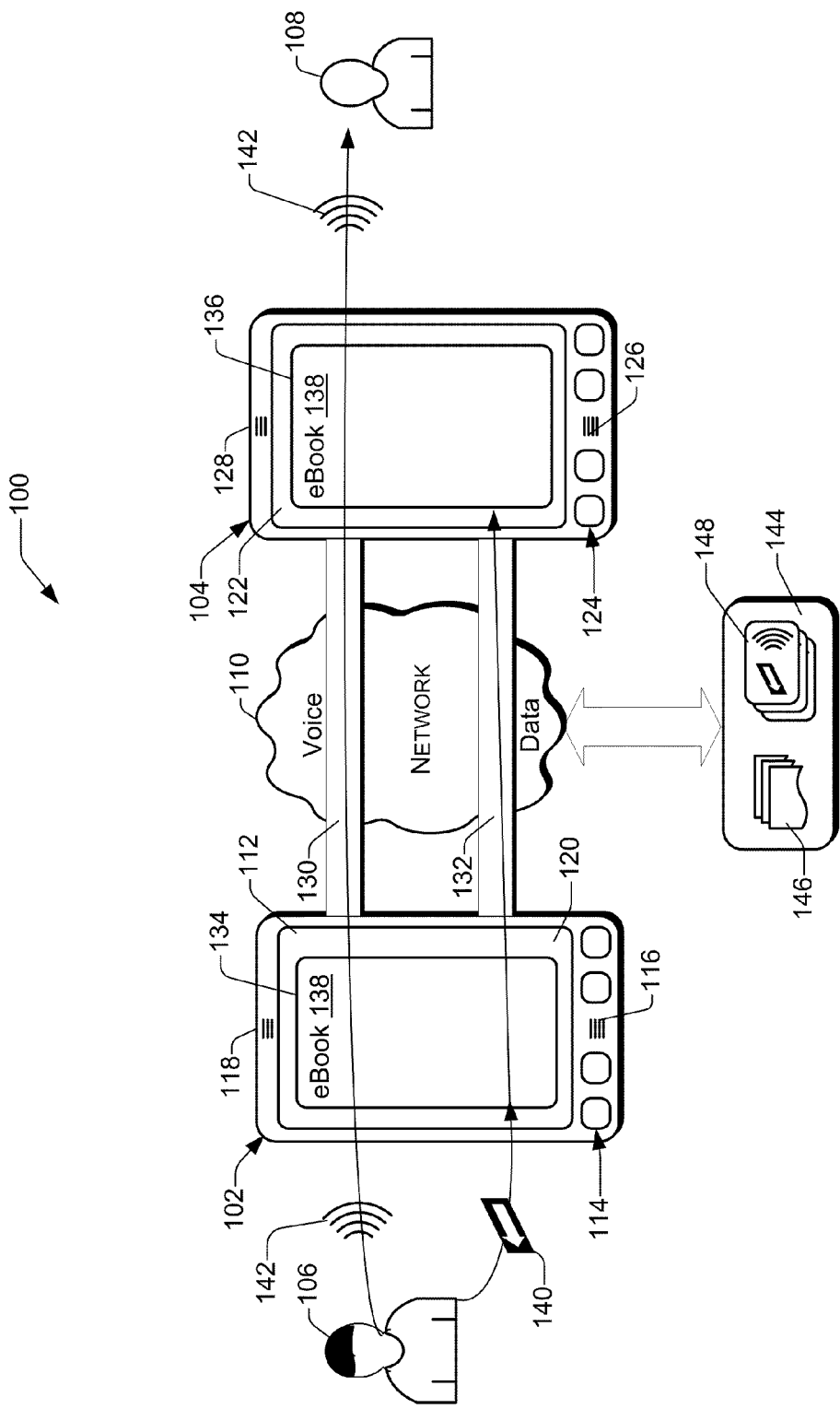
FIG. 1 illustrates an exemplary environment system 100 that facilitates voice and other modes of communication between a parent device and child device, used by a parent and a child, respectively.

FIG. 1 illustrates an exemplary system 100 that facilitates voice and other modes of communication between a parent telecommunications device 102 and child telecommunications device 104, used by a parent 106 and a child 108, respectively. Although the terms "parent device" and "child device" are used herein, a "parent device" is any type of device that can have, either directly or via an alternate interface (such as a desktop or Web interface), a primary or supervisory relationship with the "child device," regardless of whether the specific users of the "parent device" and "child device" have a parent-child relationship.

In the illustrated environment, parent device 102 can be a normal or specially configured telecommunications device. In one embodiment, child device 104 may be a specialized smart phone or other device, designed especially for young children. For example, it might have large keys, bright colors, and be ruggedized to withstand the rough treatment it might receive by children. Furthermore, the operating system and user interface of the child device might be customized for young children through simplification and graphical designs that are more appealing and understandable to children.

In one embodiment, child device 104 might be a tablet-like device having dimensions similar to those of an 8½×11 inch sheet of paper. Rather than keys, such a device might have a touch-sensitive display surface to accept user input.

In the described example, system 100 includes a cellular telecommunications infrastructure or network 110 that is accessed by wireless communications devices such as portable telephone handsets, smart phones, PDA phones, pagers, portable computers, and various other types of portable devices having wireless communications capabilities. Network 110 may be any other type of telecommunications system, such as a landline telecommunications system, an IP-based telecommunications system, or a converged telecommunications system (such as an Unlicensed Mobile Access or UMA system).

Originally intended to implement voice communications, cellular networks and other wireless communications systems now support many different types of communications, such as video, instant messaging, email, text messaging (e.g., Short Message Service or SMS messaging), multimedia messaging (e.g., Multimedia Message Service or MMS messaging), etc. Systems such as network 110 may also provide access to the Internet. Modern telecommunication devices have advanced capabilities that allow them to utilize the wide range of resources and activities available through the Internet.

Network 110 utilizes various technologies and protocols for implementing different modes of communications with and between telecommunications devices. Network 110 supports voice communications as well as data communications. Telecommunications devices utilizing network 110 can conduct various types of communications with other telecommunications devices supported by network 110, as well as with devices and resources connected to other private and/or public networks.

Numerous carriers maintain large communications networks as examples of network 110. T-Mobile, as one example, is a large mobile network operator that maintains a world-wide wireless communications infrastructure. Other operators maintain independent mobile networks, and there is a degree of cooperation and interoperability between networks. Generally, users of one mobile network can call and communicate with users of different fixed, IP-based, mobile and converged networks. In addition, users can communicate with each other through various Internet communication techniques, made possible by the connection of the various mobile networks to the Internet.

For discussion, parent device 102 and child device 104 are illustrated as being similar or identical devices. Parent device 102 has a touch-sensitive display panel 112, one or more buttons 114, a microphone 116, and a speaker 118. Similarly, child device 104 has a touch-sensitive display panel 122, one or more buttons 124, a microphone 126, and a speaker 128. The illustrated devices are merely examples of different types of devices that might be used in conjunction with the techniques described herein.

Parent device 102 and child device 104 can communicate with each other by placing a voice call from one device to the other. This is illustrated in FIG. 1 as a voice communications channel 130, also referred to as a voice call 130. In most cases, this is a bi-directional communications channel that uses available cellular technologies. VOIP (voice over IP) techniques or other protocols and technologies may also be utilized to establish voice communications channel 130.

Parent device 102 and child device 104 can also communicate data, including non-voice data, through a data communications channel or path 132. Data communications through channel 132 may utilize IP or other Internet protocols, or may utilize any other formats and protocols.

In the embodiment illustrated by FIG. 1, both parent device 102 and child device 104 are capable of executing electronic book (e-book) reader applications 134 and 136, respectively. E-book reader applications 134 and 136 can be built into devices 102 and 104, or can be discrete applications that have been installed on devices 102 and 104 by the device users or owners after purchasing the devices.

E-book reader applications 134 and 136 may comprise copies of a single application program, capable of performing slightly differently in either a master role when installed on parent device 102 or a slave role when installed on child device 104. Alternatively, application 134 may be an application that acts only as a master, while application 136 may be a different application that acts only as a slave. For purposes of discussion, they will be discussed as two different applications, referred to respectively as parent application 134 and child application 136.

Parent application 134 and child application 136 have similar core functionality, comprising the ability to display and navigate an e-book 138. Navigation can be performed by the user by appropriate controls, such as buttons 114 and 124, or by touch-sensitive controls placed on display panels 112 and 122.

More specifically, parent application 134 may include or comprise a viewer module that can be configured to display e-book 138 on display panel 112 during voice communication with child device 104. Similarly, child device 104 may include or comprise a viewer module that can be configured to display e-book 138 on display panel 122 during voice communication with parent device 102.

E-books used in conjunction with the techniques discussed herein may be simple textual works, or may be more complex works such as interactive e-books. Interactive e-books have interactive elements such as audio, video, games, links, dynamic navigation, etc., which are activated in response to certain user inputs, including navigational inputs.

In addition to core functionality for displaying and navigating an e-book, parent device 102 can function as a master device for controlling navigation on child device 104. Similarly, child device 104 can function as a slave device, accepting navigational signals from parent device 102. This additional functionality can be implemented by parent and child applications 134 and 136, or as native capabilities of one or both of parent and child devices 102 and 104.

In order for parent 106 to read e-book 138 to child 108, either the parent or the child can initiate voice call 130. Either before or during voice call 130, parent 106 can launch or initiate parent application 134 and interact with parent application 134 to display a particular e-book 138 on display surface 112 of parent device 102. Parent application 134 establishes data communications 132 with child device 104 and/or with child application 136 that is executing on child device 104. In some implementations, child device 104 might be responsive to data communications from parent device 102 to launch or open child application 136. In other implementations, child 108 might launch child application 136 by selecting an icon displayed on display panel 122, or by interacting in some other way with child device 104. Once launched, child application 136 is responsive to communications requests from parent application 134 to establish data communications channel 132 over network 110.

As parent 106 views e-book 138 on display panel 112 of parent device 102, the parent also reads e-book 138 aloud over voice call 130 to child 108. Concurrently, parent device 102 receives navigational inputs 140 from parent 106 and allows navigation through e-book 138 in response to those navigational inputs provided by the parent. In addition, parent application 134 captures or records navigational inputs 140 and transmits them to child device 104 and child application 136. Child application 136 receives navigational inputs 140 and responds to them as if they had been received locally, from a local user such child 108.

At the same time, the audio reading of the e-book, represented in FIG. 1 by symbol 142, is received and captured by parent device 102 and transmitted to child device 104 over voice call 130. Child device 104 receives audio reading 142 and plays it through its speaker 128.

Thus, e-book 138 is displayed concurrently on parent telecommunications device 102 and child device 104 during voice call 130 between the two devices. As the parent reads e-book 138 to the child aloud over voice call 130, the parent also navigates or otherwise interacts with the e-book. Navigational inputs 140 received from the parent are implemented or acted upon at parent device 102, and also transmitted to child device 104. In response to receiving navigational inputs 140 from parent device 102, child device 104 navigates the e-book 138 in accordance with the received navigational inputs 140.

Navigational control of e-book 138 can be exclusively by the parent, or can be shared with the child. In other words, child device 104 might respond solely to navigational inputs 140 received from parent device 102, or might be alternatively configured to also respond to local navigational inputs made by child 108 touching or pressing navigational controls on child device 104. In some embodiments, the ability for the child to navigate can controlled by the parent. For example, parent device 102 may offer configuration options or settings, allowing parent 106 to either enable or disable navigational control from child device 104. Alternatively, the user interface of parent application 134 might include an easily accessible soft-button or other control allowing parent 106 to enable or disable child navigation at any time while reading.

In addition to transmitting navigational inputs 140 and audio reading 142 to child device 104 as parent 106 is reading aloud, either of the two devices can be configured to record the navigational inputs 140 and audio reading 142 for later playback.

Navigational inputs 140 and audio reading 142 can be stored on either device in a format that associates them with a particular e-book, and that time-stamps navigational inputs 140 in relation to audio reading 142 so that during playback navigational inputs 140 can be timed correctly in relation to audio reading 142. Furthermore, the recorded navigational inputs 140 and audio reading 142 can be stored on either of the two telecommunications devices, on a different telecommunications device, or by some other network accessible entity such as a content or service provider. FIG. 1 shows, for example, a content provider 144 from which numerous e-books 146 can be obtained by devices 102 and 104, and which can be configured to store a recorded shared reading 148 associated with a particular e-book. Shared reading 148 comprises an audio recording of audio reading 142 and associated time-stamped navigational inputs 140.

In accordance with some embodiments, different network-connected devices, including telecommunications devices such as parent device 102 and child device 104, can access e-books and shared readings 148 from content provider 144, and play them back at any later time. As an example, a particular session between a parent and child can be recorded and stored as a shared reading 148, and provided to another relative such as a grandparent or other third party for later playback on a device not shown in FIG. 1. Shared readings might also be archived for scrapbooking, blogging, or other purposes. The third-party device might be a telecommunications device or any other network-connected device. Shared reading 148 could also be transferred to a physical medium such as a CD-ROM or DVD and physically provided to a third party for later rendering.

In some scenarios, the audio of shared readings 148 might include audio from both parent device 102 and child device 104. The reading experience will often be interactive, and child 108 may read portions of e-book 138 aloud, or might comment on or discuss e-book 138 with parent 106. During real-time sessions, both sides of this audio interaction can be captured and recorded to form part of a shared reading 148.

Similarly, the navigational inputs of shared readings 148 might include navigational inputs made by child 108 on child device 104.

In another scenario, parent 106 might create shared reading 148 in a single-party session, without interacting with child device 104. In this scenario, parent 106 opens parent application 134 to display an e-book and initiate a reading. Parent 106 reads e-book 138 while simultaneously navigating e-book 138. Navigational inputs 140 and reading 142 are recorded and saved locally or at content provider 144. At some later time, child device 104 retrieves shared reading 148 and synchronously renders both navigational inputs 140 and reading 142 at child device 104.

FIGS. 2-5 illustrate exemplary processes corresponding to the concepts and techniques described above. Note that although the processes are shown as individual steps in a particular order, the steps may or may not be segregated this way in any particular embodiment, and may be performed in different orders or sequences. Furthermore, responsibilities between different devices and entities may be allocated differently in various implementations.

Figure 2:
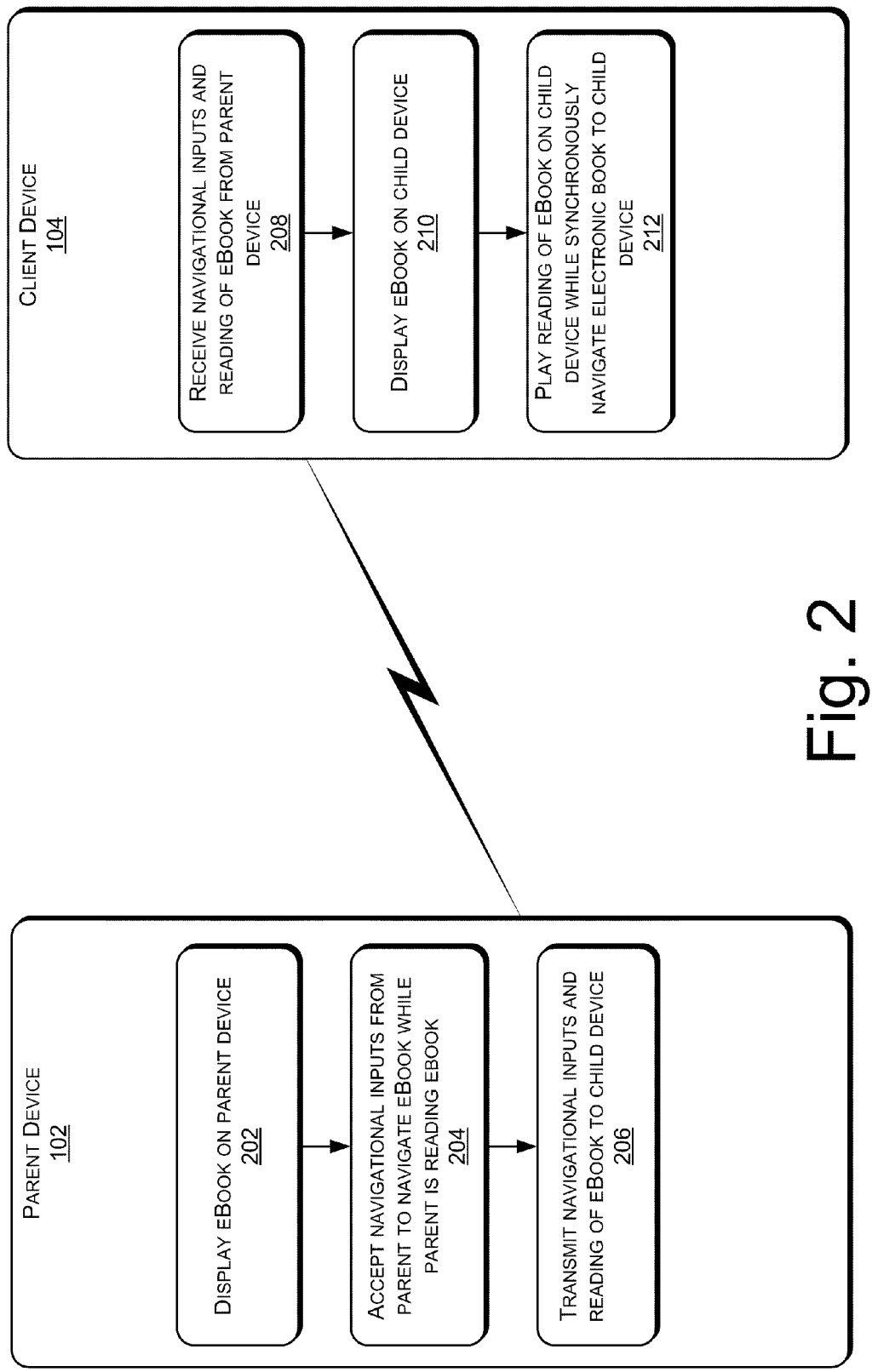
FIG. 2 illustrates steps or actions carried out by both parent device and child device in a general scenario of synchronously reading and navigating an e-book on both a parent device and a child device.

FIG. 2 illustrates steps or actions carried out by both parent device 102 and child device 104 in a general usage scenario of synchronously reading and navigating e-book 138 on both parent device 102 and child device 104. At parent device 102, an action 202 comprises displaying e-book 138 on display panel 112 of parent device 102. An action 204 comprises accepting navigational inputs from parent 106 to navigate e-book 138 while parent 106 is reading e-book 138 aloud. An action 206 comprises transmitting navigational inputs 140 and reading 142 of e-book 138 from parent device 102 to child device 104.

At child device 104, an action 208 comprises receiving navigational inputs 140 and reading 142 of e-book 138 from parent device 102. An action 210 comprises displaying e-book 138 on display panel 122 of child device 104. E-book 138 may be stored locally on child device 104, or may be streamed or downloaded from some other source such as content provider 144. Alternatively, e-book 138 may be retrieved or streamed from parent device 102.

An action 212 comprises playing reading 142 of e-book 138 on child device 104 while synchronously navigating e-book 138 on child device 104 in accordance with navigational inputs 140.

It is not necessary to transmit navigational inputs 140 or reading 142 of e-book 138 in real-time at action 206. In one scenario, action 206 is indeed performed as parent 106 is reading the e-book aloud. In this scenario, child device 104 can be configured to display e-book 138 on child device 104 during voice call 130, and receive navigational signals such as navigational inputs 142 from parent device 102 during voice call 130 to navigate e-book 138 on child device 104 while parent 106 reads the e-book aloud. Child device 104 can be further configured to execute child application 136 during voice call 130 to display e-book 138 and to navigate e-book 138 in response to receiving e-book navigation signals from parent device 102.

In another scenario, action 206 is performed after parent 106 has read the e-book aloud. This can be implemented by recording navigational inputs 140, reading 142 of e-book 138, or both at parent device 102 as they occur. Alternatively, child device 104 can be configured to record voice call 130 and navigational inputs 142 for later synchronized playback on child device 104.

Figure 3:
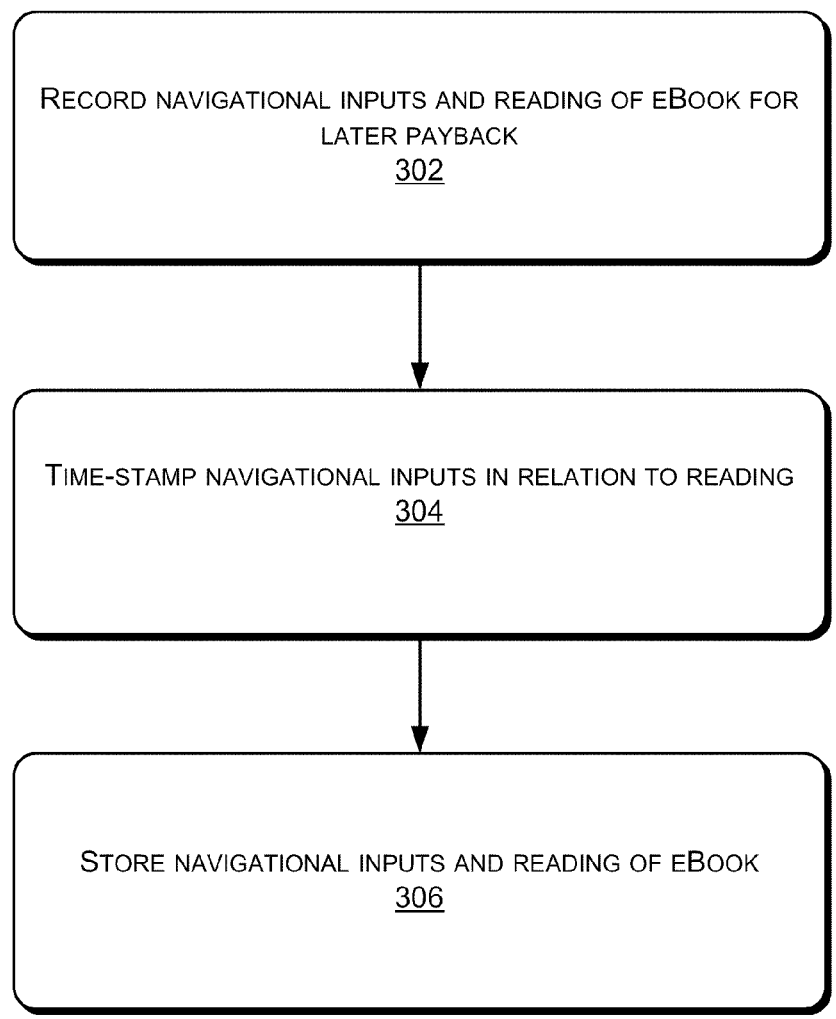
FIG. 3 illustrates an exemplary method of recording navigational inputs and reading of an e-book for later playback.

FIG. 3 illustrates an exemplary method of creating a shared e-book reading 148 for later playback. This method can be implemented on child device 102, parent device 104, or by some other system or device. An action 302 comprises recording navigational inputs 140 and reading 142. Navigational inputs 140 and readings 142 can be stored separately or associated and configured as a single object or file structure.

An action 304 comprises time-stamping navigational inputs 140 in relation to reading 142 so that during playback navigational inputs 140 can be timed correctly in relation to reading 142.

An action 306 comprises storing navigational inputs 140 and reading 142. The storage location can be at parent device 102, child device 104, or content provider 144.

There are many methods that child 108 can use to retrieve recorded navigational inputs 140 and reading 142. In one scenario, parent device 102 can transmit navigational inputs 140 and reading 142 to client device 104 at a scheduled time. In another scenario, child device 104 can request to retrieve recorded navigational inputs 140 and reading 142 from the storage locations on demand. In yet another scenario, shared reading 148 can be stored at content provider 144, which can be configured to be accessible by the public or limited to a number of users or devices, such as child 108 or child device 104. This can be implemented by setting up passwords for permitted users such as child 108 to log in to content provider 144 to retrieve shared reading 148. Alternatively, access to shared reading 148 can be conditioned upon verifying that the requesting device has a particular International Mobile Equipment Identity (IMEI).

Figure 4:
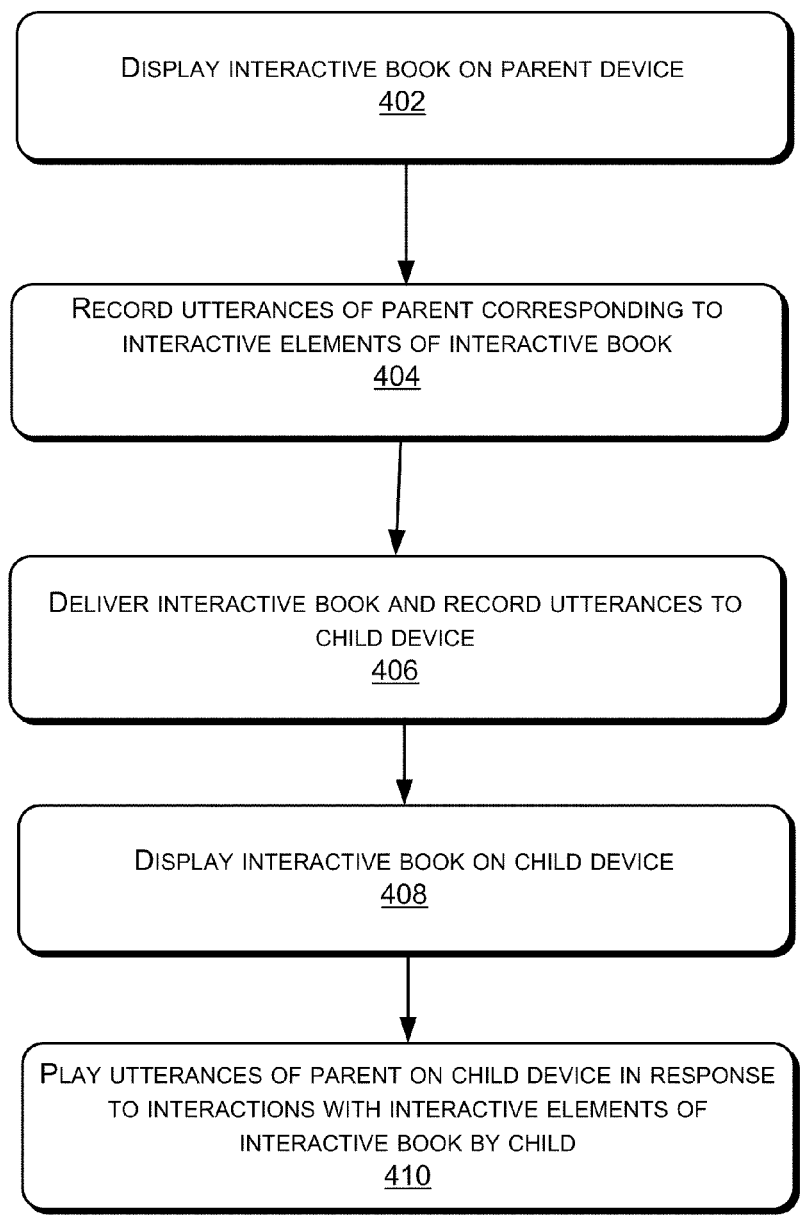
FIG. 4 further illustrates an exemplary method of recording sound effects when e-book is an interactive book.

FIG. 4 illustrates another way in which a parent or other person can participate in shared reading of an e-book. In this example, e-book 138 is an interactive e-book or other content having customizable sounds or sound effects. Rather than, or in addition to, reading e-book 138, parent application 112 can be configured to accept sounds, sound effects, and/or other utterances from parent 106 to associate with interactive elements of e-book 138. These sounds or utterances are associated with e-book 138, such as in shared reading 148, and played back in conjunction with the interactive elements on child device 104.

An action 402 comprises displaying an interactive book on parent device 102. An action 404 comprises recording utterances of parent 106 corresponding to interactive elements of the interactive book. An action 406 comprises delivering the interactive book and recorded utterances to child device 104. An action 408 comprises displaying the interactive book on child device 104. An action 410 comprises playing the utterances of parent 106 on child device 104 in response to interactions with the interactive elements of the interactive book by child 108. The utterances of parent 106 can include sound effects corresponding to interactive elements of the interactive book. The utterances of parent 106 can also include phrases corresponding to interactive elements of the interactive book. The utterances of parent 106 can also include representations of words represented by the interactive book.

Figure 5:
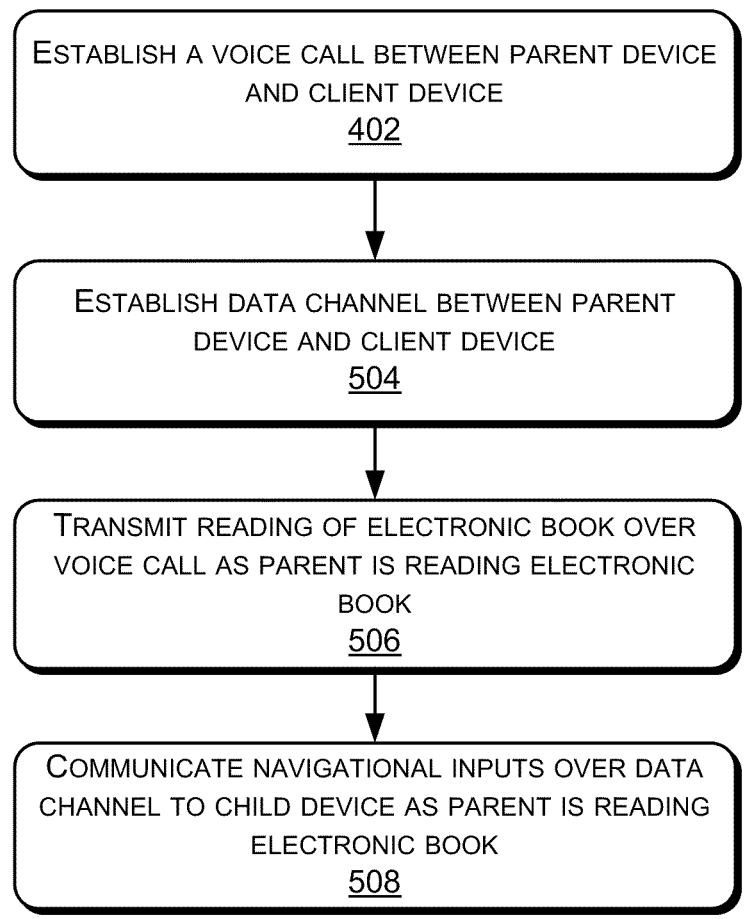
FIG. 5 illustrates an exemplary method of establishing a voice communication channel and a data communication channel for transmitting an e-book reading and associated navigational inputs from a parent device to child device.

FIG. 5 additional details regarding the interactions between child device 102 and parent device 104 during a real-time reading of a shared e-book. An action 502 comprises establishing voice call 130 between parent device 102 and child device 104. An action 504 comprises establishing data communication channel 132 between parent device 102 and child device 104. Note that these actions can be performed or initiated by either of the involved devices.

An action 506 comprises communicating reading 142 of e-book 138 from parent device 102 to child device 104 over as the parent reads the e-book. More specifically, this includes transmitting reading 142 of e-book 138 over voice call 130 from parent device 102, and receiving reading 142 by child device 104.

An action 508 comprises communicating navigational inputs 140 from parent device 102 to child device 104 as the parent reads the e-book. More specifically, this includes transmitting navigational inputs 140 over data communication channel 132 to child device 104, and receiving navigational inputs 140 by child device 104.

In addition to transmitting navigational inputs 140 and reading 142 of e-book 138 or shared reading 148 to child device 104, parent device 102 can also transmit them to a third party device. The third party device can be a device similar to parent device 102 or child device 104, and might belong to another relative such as a grandparent.

Figure 6:
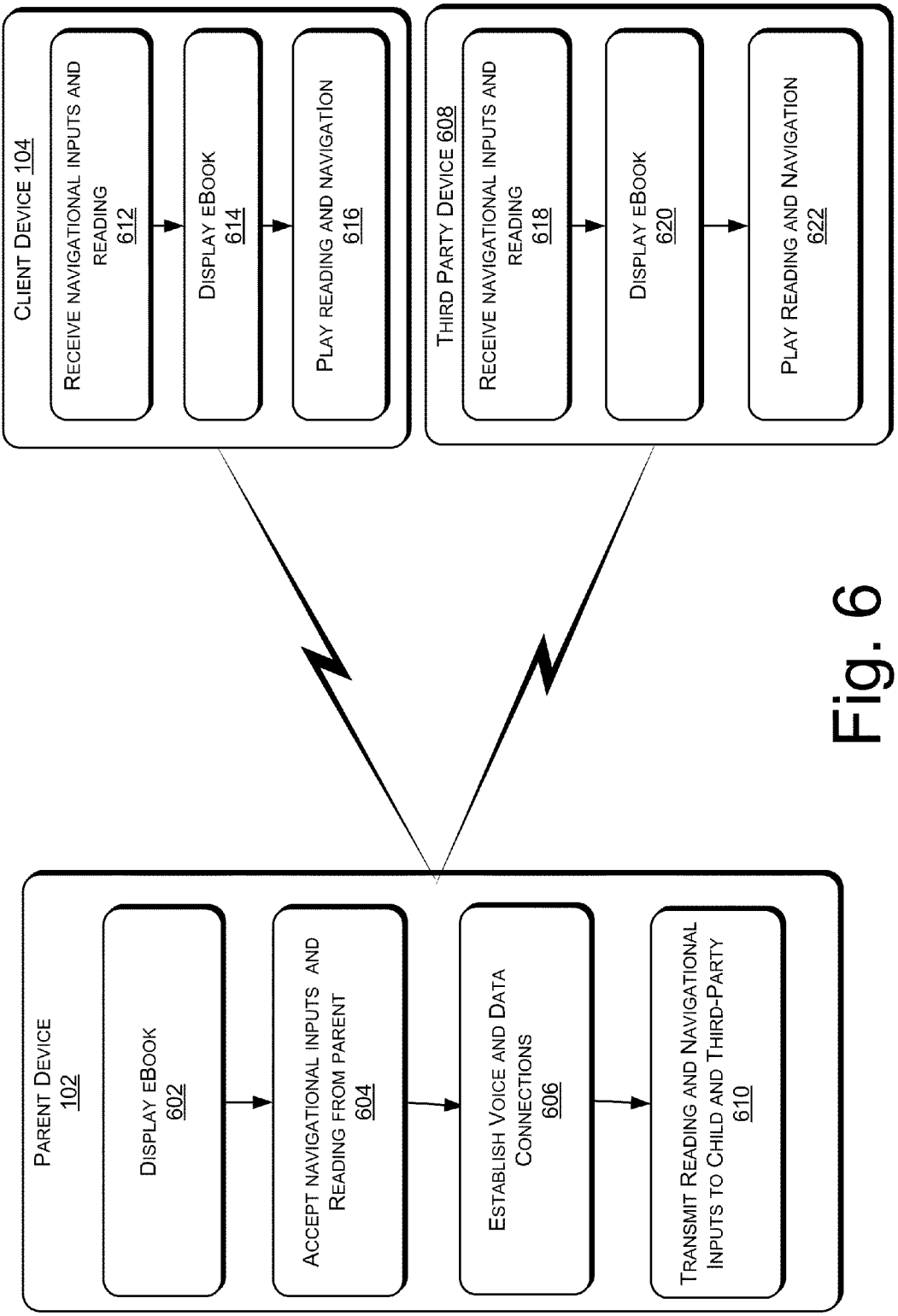
FIG. 6 illustrates an exemplary method in which a parent device transmits an e-book reading and associated navigational inputs to both a child device and third party device.

FIG. 6 illustrates an exemplary method in which a reading and associated navigational inputs are provided for playback by a third party while also reading with a child. At parent device 102, an action 602 comprises displaying e-book 138 on display panel 112. An action 604 comprises receiving navigational inputs 140 and reading 142 from the user of parent device 102. An action 606 comprises simultaneously establishing a multi-party voice call and data connection between parent device 102, child device 104, and a third-party device 608. An action 610 comprises transmitting navigational inputs 140 and reading 142 to both child device 104 and a third-party device 608.

At client device 104, an action 612 comprises receiving navigational inputs 140 and reading 142 from parent device 102. An action 614 comprises displaying e-book 138 on display panel 122. An action 616 comprises audibly playing reading 142 while at the same time navigating e-book 138 in accordance with the received navigational inputs 140.

At third-party device 608, an action 618 comprises receiving navigational inputs 140 and reading 142 from parent device 102. An action 620 comprises displaying e-book 138 on third-party device 608. An action 622 comprises audibly playing reading 142 while at the same time navigating e-book 138 on device 608 in accordance with the received navigational inputs 140.

Although the preceding discussion refers to reading 142 as a discrete object, note that reading 142 in many scenarios is simply a voice conversation between parent device 102, child device 104, and possibly a third-party device 606.

As described previously, it is not necessary to transmit navigational inputs 140 or reading 142 of e-book 138 to third party device 502 in real-time in all embodiments. In one scenario, shared reading 144 is provided to recipient devices as parent 106 is reading e-book 138 aloud. In other scenarios, however, shared reading 144 is delivered and or consumed at a later time.

FIGS. 7-24 illustrate a general environment in which the concepts and techniques described above may be implemented. In particular, the following discussion relates to application sharing between two or more telecommunications devices. Application sharing such as this can be used to synchronously read and navigate an e-book on a parent device and a child device as discussed above. More specifically, parent application 134 and child application 136 may be implemented as a "shareable application," as set forth in the following discussion. The discussion below also provides additional details and techniques that can be used in conjunction with the system shown in FIG. 1.

Figure 7:
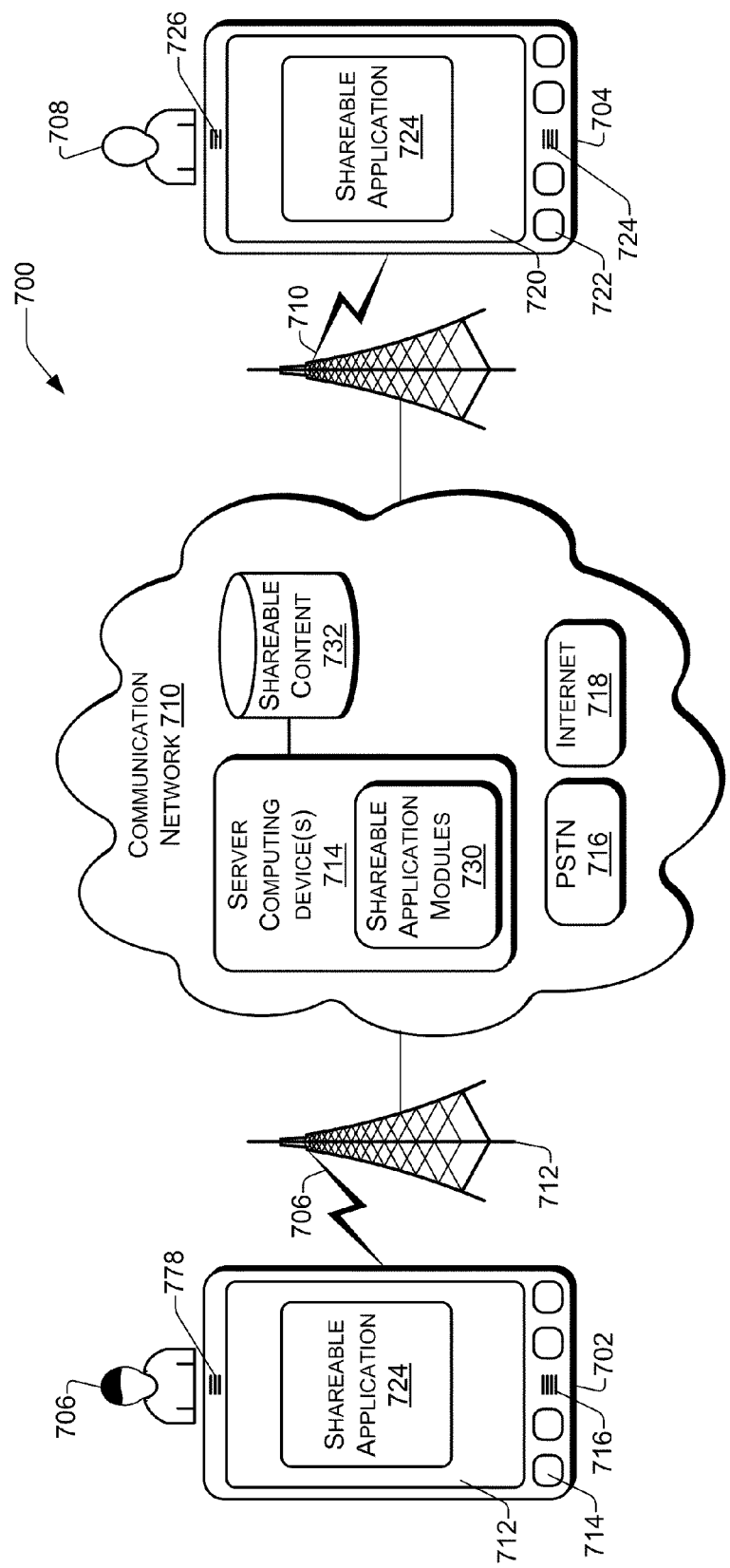
FIG. 7 illustrates a schematic view of an exemplary implementation of a communication system between two telecommunications devices.

FIG. 7 illustrates an exemplary implementation of a communication system 700, which includes a first telecommunications device 702 communicating with a communication network 704 through, in this example, a wireless link 706. A second telecommunications device 708 communicates with the communication network 704 via a second wireless link 710. As discussed more fully herein, it will be understood by one of skill in the art that although wireless links 706, 710 are typical of wireless or cellular telecommunications, any type of wired or wireless connection, such as wired or wireless communications associated with traditional landline networks and IP-based networks, or any combination of these, provide suitable implementations. For cellular-based embodiments, at least a portion of the communication network 704 may enable communication by a plurality of telecommunications devices, including the telecommunications devices 702, 708, via networks utilizing any type of cellular-radio-based communication protocols such as GSM (Global System for Telecommunications), UMTS (Universal Mobile Telecommunication system), CDMA (Code Division Multiple Access), D-AMPS (Digital Advanced Mobile Telecommunications device System), TDMA (Time Division Multiple Access), iDEN (Integrated Digital Enhanced Network), GPRS (General Packet Radio Service), EDGE (Enhanced Data rates for GSM Evolution), WCDMA (Wideband Code Division Multiple Access), and their variants. The communication network 704 may also enable or permit communication between or with the plurality of telecommunications devices via a peer-to-peer or ad hoc system utilizing appropriate communication protocols such as Bluetooth®, IEEE 802.11, IEEE 802.16, and the like. Further, while implementations are often illustrated herein as being between two telecommunications devices, it should be understood that three or more telecommunications devices can communicate simultaneously, and that the implementations herein can be applied to three or more telecommunications devices as well.

The communication network 704 may include a variety of components for proper operation and communication with the telecommunications devices 702, 708. For example, for the communications network and infrastructure illustrated in FIG. 1, the communication network 704 includes wireless communication capabilities for connecting a plurality of base stations 712 (which may include traditional cellular base stations, femtocells, picocells, and other access points) and one or more server computing devices 714, such as network service provider (NSP) servers, Internet service provider servers, home network servers, enterprise servers, or other server computing devices for controlling communications on the communication network 704. The server computing device(s) 714 may be part of a data center, server farm, computing cluster, storage area network, or other architecture for receiving, processing and transmitting communications and application threads and processes, as well as for storing content to be shared between telecommunications devices 702, 708. A variety of additional components may be coupled between and/or to the plurality of base stations 712 and the server computing device(s) 714 and other communication network components, but these additional components are not illustrated in this implementation for clarity of explanation.

The communication system 700 and communication network 704 may also include wire-based networks (e.g., telephone, cable) and other wireless networks (e.g., cellular, satellite, etc.). The communication system 700 and communication network 704 may use any number of protocols and configurations to enable a plurality of telecommunications devices to access other devices and resources. The communication system 700 and communication network 704 may include several types of circuit-switched telephone networks, such as a Public Switched Telephone Network (PSTN) 716 and packet-switched networks. Thus, communication network 704 is able to communicate with landline telephones via the PSTN 716, and may further include a plurality of wireless communication networks maintained by a plurality of different wireless network service providers.

Furthermore, communication network 704 may also include or be in communication with the Internet 718. For example, at least some server computing devices 714 can be able to communicate with the Internet 718. Thus, in some implementations or situations, the telecommunications devices 702, 708 can access the Internet 718 through cellular radio communications via server computing devices 714, such as via EVDO (Evolution-Data Optimized) communications or other technologies. In other implementations or situations, telecommunications devices 702, 708 can access the Internet 718 directly, such as via a wireless access point using Wi-Fi, WiMax, or the like.

In the implementation illustrated in FIG. 7, a user 720 of the first telecommunications device 702 may place a voice call to a user 722 of second telecommunications device 708, or vice versa, through communication network 704 for having a voice conversation between the user 720 and the user 722. Additionally, user 720 may elect to send a data signal, such as a text message or picture message to the user 722, or vice versa, via communication network 704. Also, the users 720, 722 may connect telecommunications devices 702, 708, respectively to the Internet 718, such as via cellular communications or wireless access points, such as for sending emails, instant messaging, or the like.

At least one of the telecommunications devices 702, 708 includes one or more shareable applications 724. For example, suppose the user 720 calls the user 722. The voice call is routed from the first telecommunications device 702 to the second telecommunications device 708 via the communication network 704 to create a voice communication channel. During this conversation, suppose the user 720 wants to share some information, process, or interactive experience with the second user 722. For example, the first user might want to show some pictures of a recent vacation or a slide show of an upcoming business meeting. During the call, some implementations of the shareable applications 724 allow the users to share the experience of viewing the pictures or slides while being able to discuss them at the same time over the voice channel. Further, the shareable application 724 may monitor or interact with the conversation to provide additional functions and features to enhance the users' experience while viewing the pictures or slides.

Further, server computing device(s) 714 on the communication network can also include one or more shareable application modules 730 that can, in some implementations, interact with, cooperate with, or facilitate the sharable applications on the telecommunications devices. The shareable application modules 730 may be provided in addition to or instead of shareable applications 724 on the telecommunications devices. For example, shareable content 732 may be stored on the communication network, such as at a storage array, data center, server farm, or the like. The shareable content may include the photographs or slides that the first user 720 wants to share with the second user 722. Thus, rather than having to store the content on the telecommunications device 702 and transmit the content to the other telecommunications device 708, the server computing device can retrieve the shareable content 732 and transmit the shareable content to each of the telecommunications devices during the voice conversation. In some examples, the shareable content may be transmitted by downloading the content to the receiving device (i.e., a copy is stored at the receiving device), while in other examples, the content may be served or streamed in a transitory manner (i.e., the content may be available to the receiving device for read-only access, but cannot be stored on the receiving device).

In some implementations, as described further below, shareable applications monitor a voice communication channel and perform a function in response to detecting a specified hook or predetermined condition in the voice conversation. Further, in some implementations, shareable applications include applications executing on a plurality of telecommunications devices that enable sharing of data among corresponding applications on the telecommunications devices while the users of the telecommunications devices carry on a voice conversation with each other. In addition, in some implementations, the server computing device(s) include counterpart shareable application modules that carry out functions that facilitate the shareable applications on one or more telecommunications devices. Additionally, some implementations include shareable applications executing on a plurality of telecommunications devices that enable sharing of data among corresponding applications on the telecommunications devices while the users carry on a voice conversation with each other and the shareable applications also monitor the voice communication for performing one or more functions in response to a specified hook or predetermined condition in the voice conversation.

Exemplary Telecommunications Device Architecture

Figure 8A:
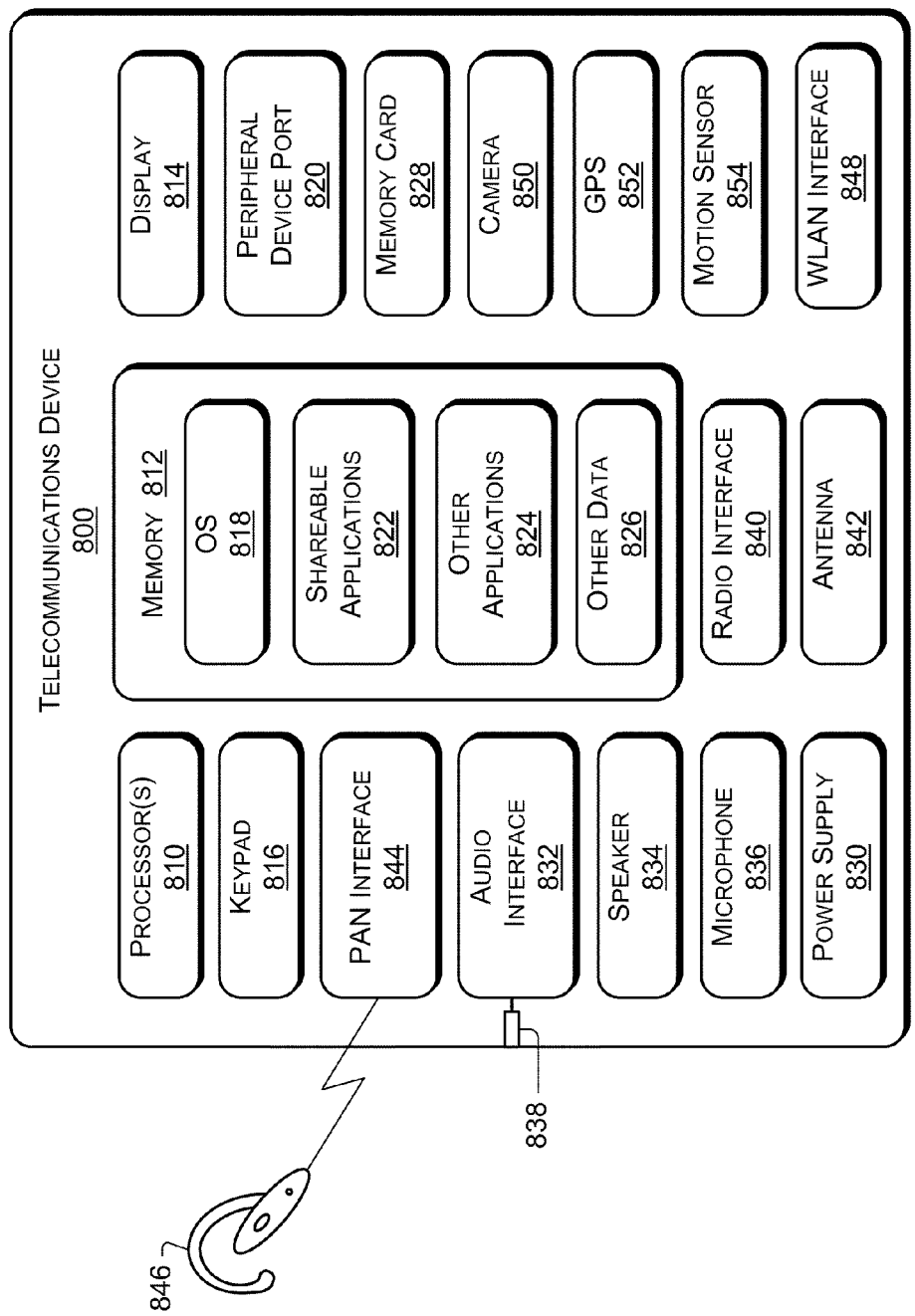
FIG. 8A illustrates an exemplary configuration of an implementation of a telecommunications device.

FIG. 8A illustrates an exemplary configuration of a telecommunications device 800 suitable for executing the shareable applications implemented herein. Telecommunications device 800 is an example of a telecommunications device that may correspond to either of telecommunications devices 702, 708, or other telecommunications devices discussed herein. Telecommunications device 800 has one or more processors 810, a memory 812, a display 814, and a keypad 816. Memory 812 generally includes both volatile memory and non-volatile memory (e.g., RAM, ROM, Flash Memory, miniature hard drive, memory card, or the like). Telecommunications device 800 includes an operating system (OS) 818, which is resident in memory 812 and which is executed by processor 810. Keypad 816 may be a push button numeric dialing pad (such as on a typical telecommunications device), a multi-key keyboard (such as a conventional QWERTY keyboard), or one or more other types of keys or buttons, and may also include a joystick-like controller and/or designated navigation buttons, or the like. Display 814 may be a liquid crystal display, or any other type of display commonly used in telecommunications devices. For example, display 814 may be a touch-sensitive touch screen, and can then also act as an input device or keypad, such as for providing a soft-key keyboard, navigation buttons, or the like. A peripheral device port 820 may be included and may be of the type to accept additional memory cards, game cards, modem cards, or other types of peripheral devices.

One or more shareable application programs 822, as discussed above, and as described further below, are loaded into memory 812 and are run by or in conjunction with operating system (OS) 818. Further, one or more other application programs 824 may also be included in memory 812. Examples of other application programs 824 include conventional application programs, such as game programs, navigation programs, installation wizard programs, email programs, scheduling programs, PIM (personal information management) programs, word processing programs, spreadsheet programs, Internet web browser programs, and so forth. Telecommunications device 800 also includes other data storage 826 within memory 812. Other data storage 826 may be used to store information that is retained when the telecommunications device 800 is powered down. For example, applications 822 may use and store persistent information in the other data storage 826, such as messages used by an e-mail application, contact information used by a personal information manager, documents used by a word processing program, device driver programs, and the like.

Additionally, in some implementations, telecommunications device 800 may include a SIM (subscriber identity module) card 828, which is a removable memory card used to identify a user of the telecommunications device 800 to the network service provider. One or more of the shareable applications 822 may additionally or alternatively be stored in SIM card 828, such that the one or more shareable applications 822 become available to the telecommunications device 800 when the SIM card 828 is installed in the telecommunications device 800. In this manner a user's shareable applications can be easily moved between telecommunications devices as the SIM card 828 is moved between those devices, such as when a user purchases a new telecommunications device, replaces a broken device, or the like.

Telecommunications device 800 also includes a power supply 830, which may be implemented as one or more batteries. The power supply 830 might further include an external power source, such as an AC adapter or a powered docking cradle for supplementing or recharging the batteries.

Telecommunications device 800 also includes an audio interface 832 that is coupled to a built-in speaker 834 and microphone 836. The audio interface 832 is used to provide audible signals to and receive audible signals from the user of telecommunications device 800. For example, the speaker 834 provides audible output and microphone 836 receives audible input, such as to facilitate a voice conversation. Telecommunications device 800 may include a speakerphone feature to enable telecommunications device 800 to be held away from the user's head during use, thereby facilitating simultaneous viewing of display 814. Audio interface 832 is also in communication with a headphone jack 838 to permit a wired headset including earphones and a microphone to be plugged in to telecommunications device 800 in some implementations to operate in place of built-in speaker 834 and microphone 836.

Telecommunications device 800 also includes, in wireless embodiments, a radio transceiver and interface 840 that performs the function of transmitting and receiving radio frequency communications via an antenna 842. The radio interface 840 facilitates wireless connectivity between the telecommunications device 800 and various cell towers, base stations and/or access points. Transmissions to and from the radio interface 840 are conducted under control of the operating system 818. For example, communications received by the radio interface 840 may be disseminated to application programs 822 via the operating system 818, and vice versa.

Telecommunications device 800 also may include a personal area network (PAN) interface 844, such as Bluetooth®, that performs a function of transmitting and receiving short-range radio communications. For example, a wireless headset 846 may be connected for communication with telecommunications device 800 via Bluetooth® interface 844 for providing an earphone and microphone to be used in place of built in speaker 834 and microphone 836. Further, (PAN) interface 844 may be used for other functions, as is known in the art, such as communicating directly with nearby devices that are also Bluetooth® enabled.

Telecommunications device 800 also may include a wireless LAN (WiFi) interface 848 that performs the function of transmitting and receiving wireless communications using the IEEE 802.11 and/or 802.16 standards. For example, telecommunications device 800 can use WiFi interface 848 to communicate directly with a nearby wireless access point such as for accessing the Internet directly without having to perform the access through the network service provider's network.

Telecommunications device 800 also may include a camera 850 for taking video and still photographs using telecommunications device 800. Telecommunications device 800 also may be outfitted with a global positioning system (GPS) transponder 852 for endowing telecommunications device 800 with various GPS capabilities such as navigation, mapping, or the like. Further, telecommunications device 800 may include a motion sensor 854, such as an accelerometer for determining position, attitude and/or movement of telecommunications device 800, such as for adjusting display orientation, or the like. In addition, while various components, features, and functions of a telecommunications device 800 have been described in the implementation illustrated in FIG. 8A, it should be understood that numerous other configurations, components, features, and the like may be incorporated into telecommunications devices described herein, and that the implementations herein are not limited to any particular configuration for telecommunications devices.

Exemplary Telecommunications Device Logical Configuration

Figure 8B:
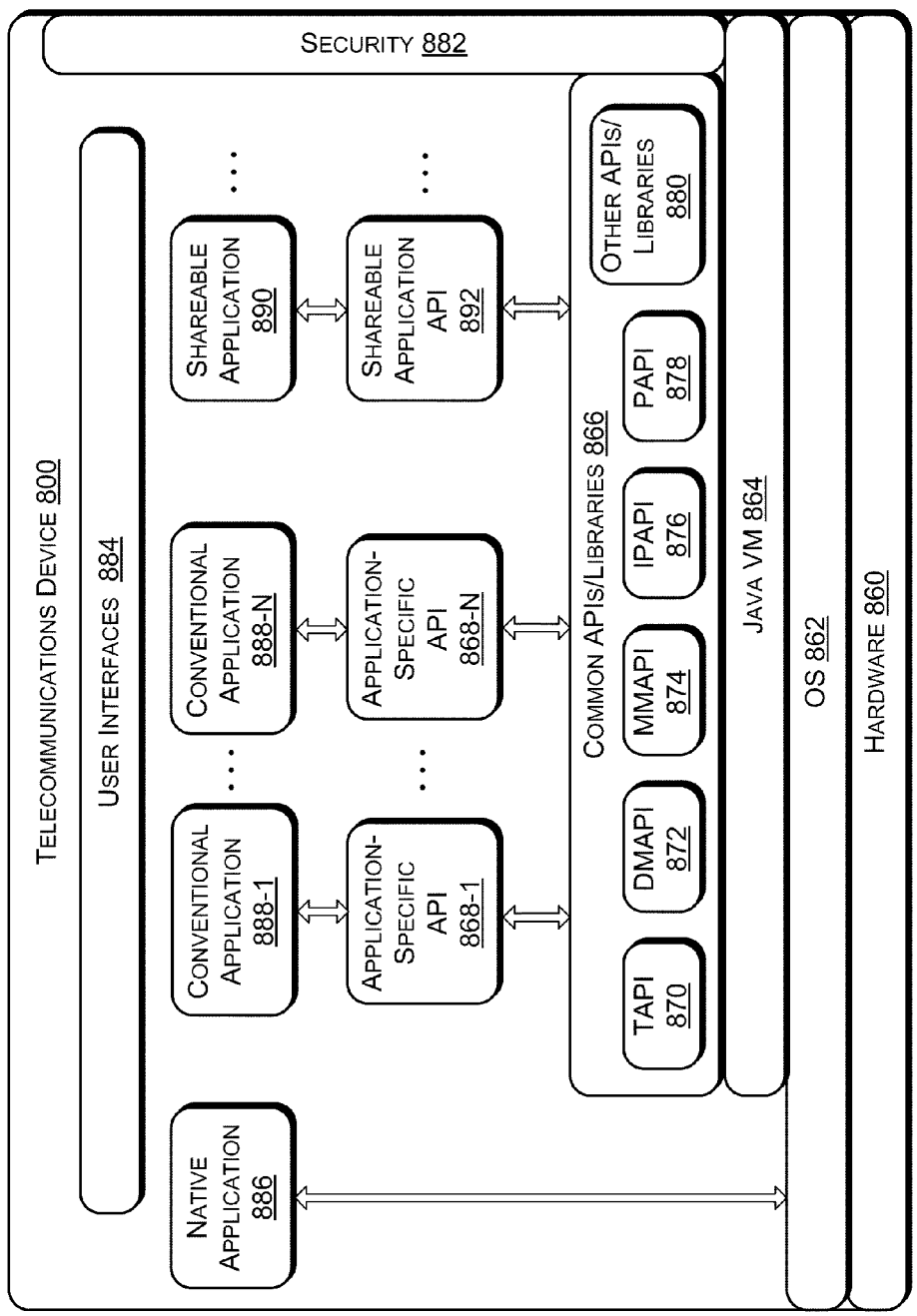
FIG. 8B illustrates an exemplary logical configuration of an implementation of a telecommunications device.

FIG. 8B illustrates an exemplary logical configuration of an implementation of telecommunications device 800 capable of running a variety of different types of applications, including the shareable applications implemented herein. Telecommunications device 800 may correspond to any of telecommunications devices 702, 708, or other telecommunications devices discussed herein. In this example, telecommunications device 800 includes hardware 860 which, as described above with reference to telecommunications device 800 of FIG. 8A, may include a wireless radio transceiver, a suitably programmed processor, and a memory that stores executable code executed by the processor for carrying out the operations described herein. In some implementations, the processor may be implemented as one or more processing devices, discrete logic, or any suitable combination of hardware, software, or firmware for executing the operating system, application program interfaces (APIs), modules, applications, and other software components described.

Telecommunications device 800 includes a plurality of program modules which in this example include an operating system 862, a Java virtual machine 864, a plurality of common APIs and libraries 866, and a plurality of application specific APIs 868-1 . . . 868-N. The Java virtual machine is one example of an implementation for providing and executing the common APIs/libraries 866 on the OS 862, and it should be understood that the disclosure herein is not limited to this implementation. In this example, at least some of the common APIs/libraries 866 are used to interface with hardware components or processes of telecommunications device 800, and are generally shared in common by all the applications that run on the telecommunications device. The common APIs/libraries 866 may include for example, a telephony API (TAPI) 870, a telecommunications device management API (DMAPI) 872, a multimedia API (MMAPI) 874, an Internet Protocol API (IPAPI) 876, a peripheral API (PAPI) 878, or any other suitable shared APIs 880. A security layer 882 on telecommunications device manages application authorization and access to the operating system 862 and hardware 860 of telecommunications device 800.

Common APIs and libraries are shared among various applications, and have at least two characteristics, namely an interface and an object, for providing services. The interface is the specification of the API's public methods. The object implements the interface and provides the functionality described in the interface. In some implementations, invoking a method on a common API is done in the context of the caller, such as via a thread or stack. A common API may return a value to the requesting caller by depositing the value directly on the caller's stack. Examples of services provided by common APIs include messaging, security, digital rights management (DRM), device management, persistence, synchronization and power management. In addition, a library is a set of services contained in an object that can either be statically linked or dynamically loaded into executable code. Library services may invoke other library services or services contained in daemons, which are external to the library and may also run in a different process context.

Various applications are able to execute on telecommunications device 800. The applications are typically user-initiated executable code whose lifecycle (start, stop, suspend, pause, resume) may be managed by the user, by the OS 862, or by another application. In some cases, the applications may present a user interface 884 which may overlay or augment a user interface presented by the OS 862, and/or in some cases the applications may use or provide services.

In the illustrated example, the applications include one or more native applications 886, one more conventional applications 888-1 . . . 888-N, and one or more shareable applications 890. The one or more shareable applications 890 are designed to operate on the telecommunications device 800 during a simultaneous voice conversation, and are described in additional detail below. Shareable applications 890 use a shareable application API 892 and/or other middleware, which enables the shareable application 890 to interact with the operating system 862, the telecommunications device hardware 860, and the common APIs/libraries 866. For example, it is desirable for the shareable applications 890 to run off a shareable application API 892 or other middleware that renders development of shareable applications 890 uniform across multiple types of telecommunications devices. Thus, the shareable application API 892 may be developed specifically for a certain model or brand of telecommunications device, while the corresponding shareable application 890 is designed to function on numerous different types of telecommunications devices. Native applications 886 are applications that are able to interact directly with the operating system 862 and do not generally require access to the common APIs/libraries 866 or JAVA virtual machine 864. Some or all of conventional applications may be third party applications, such as might be downloaded from an apps store for execution on telecommunications device 800. These conventional applications 888-1 . . . 888-N may each include a corresponding application-specific API 868-1 . . . 868-N that enables the application 888 to interact with the hardware and other services available on telecommunications device 800. Each of the functional blocks, as illustrated in FIG. 8B, communicate with one another through conventional communication links represented by the arrows, such as through suitable API method calls or any other suitable techniques.

Server Computing Device

Figure 9:
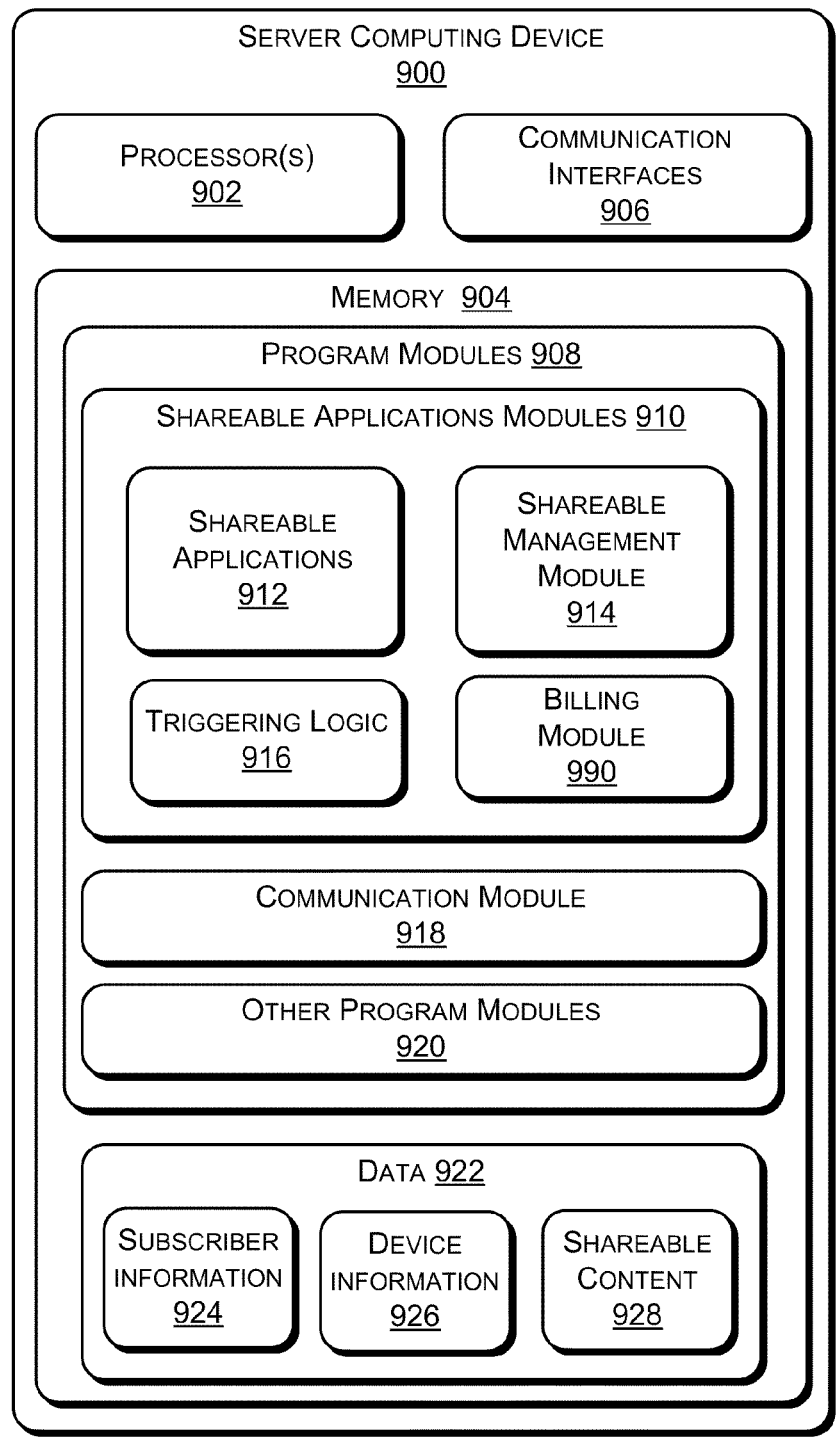
FIG. 9 illustrates an exemplary configuration of a server computing device.

FIG. 9 illustrates an exemplary logical and hardware configuration of a server computing device 900. Implementations of server computing device 900 may correspond to the one or more server computing devices 714, such as NSP servers, or other servers or computing devices used to implement and facilitate the use of the shareable applications herein over a network, or the like. In the illustrated example, server computing device 900 includes one or more processors 902, a memory 904, and one or more communication interfaces 906. The processor(s) 902 can be a single processing unit or a number of processing units, all of which could include multiple computing units in a single computer or multiple separate computers. The processor(s) 902 may be implemented as one or more microprocessors, microcomputers, microcontrollers, digital signal processors, central processing units, state machines, logic circuitries, and/or any devices that manipulate signals based on operational instructions. Among other capabilities, the processor(s) 902 can be configured to load and execute computer-readable instructions stored in the memory 904 or other computer-readable storage media.

The memory 904 can include any computer-readable storage media known in the art including, for example, volatile memory (e.g., RAM) and/or non-volatile memory (e.g., flash, etc.), mass storage devices, such as hard disk drives, solid state drives, removable media, including external and removable drives, or the like. The memory 904 stores processor-executable program instructions or code that can be executed by the processor(s) 902 for carrying out the services, methods and functions described herein.

The communication interface(s) 906 facilitate communication between the server computing device 900 and telecommunications devices 702, 708, 800. For example, the communication interface(s) 906 may include one or more ports for connecting to a number of telecommunication devices. The communication interface(s) 906 can facilitate communications within a wide variety of networks and protocol types, including wireless networks (e.g., cellular, satellite, WLAN, etc.) and wired networks (e.g., LAN, cable, etc.).

Memory 904 includes a plurality of program modules 908 stored therein and executable by processor(s) 902 for carrying out implementations herein. Program modules 908 include shareable application modules 910 that include one or more shareable applications 912, a shareable application management module 914 for determining which shareable application to use and for controlling use of those application, and triggering logic 916, that determines when a shareable application on a telecommunications device needs to be facilitated, interacted with, or the like. Program modules 908 also include a communication module for enabling the server computing device to communicate with telecommunications devices and other computing devices, and other program modules, such as an operating system, drivers, and the like. Server computing device 900 also includes various types of data 922, such as subscriber information 924 and device information 926, and service provider information 928. Additionally, server computing device 900 may also store shareable content 928 onboard, but in other implementations, as illustrated in FIG. 7, this content may be stored in a separate mass storage array or other storage facility. Further, server computing device may include a billing module 930 that can charge users for network activities, such as storing shareable content 732, 928 on the server computing device 900, transmission or streaming of the content to a telecommunications device, executing processor-intensive applications, or the like. In addition, billing module can also track and charge for sales and downloading of shareable applications. For example, shareable application management module 914 may provide an application store for sale and download of shareable applications to the telecommunications devices. Billing module 930 can track these sales and bill appropriately. Further in some implementations, shareable application management module 914 may include digital right management features for controlling access to sharable content 732, 928 that is subject to digital rights management (e.g., music, images, video, etc. that is subject to copyright protection). Other variations will also be apparent to those of skill in the art, and thus, implementations disclosed herein are not limited to the particular example illustrated.

Shareable Applications

As discussed above, shareable applications according to implementations herein may be included on at least one telecommunications device that is party to a voice communication involving a plurality of telecommunications devices. In some implementations, the shareable application runs in the background on the telecommunications device and becomes active only upon detecting a particular predetermined condition in the voice communication channel. Further, in some implementations, the shareable application may include multiple instances on multiple telecommunications devices that interact with each other, and that may be activated on a first telecommunications device and also on a second telecommunications device to which the first telecommunications device is connected by a voice communication channel. Accordingly, in some implementations, the shareable applications are unilateral and only need to be activated on a single telecommunications device, while in other implementations the shareable applications are bilateral and need to be activated on two or more telecommunications devices that are party to a voice communication.

Unilateral Shareable Applications

Figure 10:
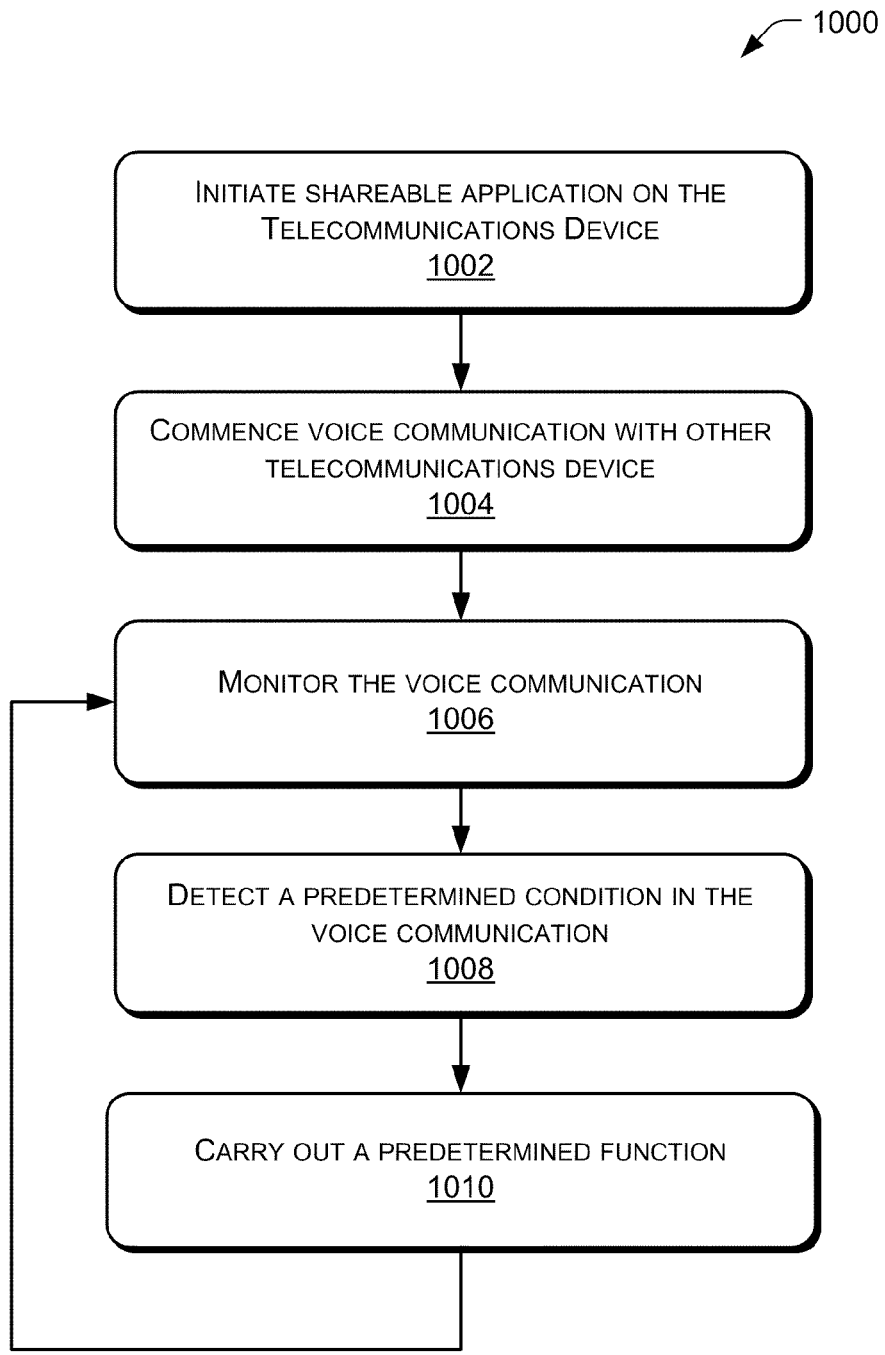
FIG. 10 illustrates a flow chart representing an exemplary implementation of a process carried out in conjunction with execution of a unilateral shareable application on a telecommunications device.

FIG. 10 illustrates an exemplary process 1000 carried out in conjunction with execution of a unilateral shareable application on a first telecommunications device, such as any of telecommunications devices 702, 708, 800 described above, or other telecommunications devices described herein.

At block 1002, a sharable application is initiated on a telecommunications device. For example, the shareable application may be activated upon start up of the telecommunications device or can be selected by a user of the telecommunications device to become active at some point. In some implementations, the shareable application may start up or become active automatically, such as when the telecommunications device initiates an outgoing call, or receives an incoming call, or in response to some other trigger event. For example, an API, such as shareable application API 892, may be installed on the telecommunications device and configured to automatically start the shareable application when an incoming or outgoing voice call is detected. In other implementations, the user may decide to activate the shareable application after the voice communication has been established.

At block 1004, a voice communication channel is established between a plurality of telecommunications devices for enabling voice communications to be carried out between the telecommunications devices. For example, each of the telecommunications devices may initiate an outgoing call, or receive an incoming call. In a particular example, a voice telecommunication is established, in GSM embodiments, when a telecommunications device user dials a phone number of another party. The call is received at a switch or Mobile Switching Center (MSC) serving the receiving telecommunications device. The MSC, based upon the received dialed phone number, polls a subscriber registry or Home Location Register (HLR) to determine, among other things, whether the called party's telecommunications device is registered on the telecommunications network and where the device is located. The MSC then signals the receiving user's telecommunications device to alert it that an incoming voice communication is available for acceptance. This signaling initiates a ringtone sequence in the receiving telecommunications device and, if the user accepts the incoming call, a signal is dispatched from the receiving telecommunications device back to the MSC to connect the communication to the initiating telecommunications device. In other implementations, the voice communication may be established using Circuited Switched (CS) voice over Internet Protocol (IP), similar to Unlicensed Mobile Access (UMA), or IP Multimedia Subsystem (IMS) that can include Session Initiation Protocol (SIP), as is discussed further below with reference to FIGS. 16B-16C. Additionally, as discussed above, shareable applications may already be active on the telecommunications device, may automatically start up or become active on the telecommunications device as a result of receiving a call or initiating a call, or may become active sometime after the call is established in response to some triggering event. Accordingly, block 1004 may take place before, after, or concurrently with block 1002.

At block 1006, in some implementations, the shareable application monitors the voice communication between the telecommunications devices. For example, the shareable application monitors a conversation carried on by the users of the telecommunications devices. In some implementations, the shareable application may run in the background and only become apparent when a predetermined condition or hook is detected. In other implementations, the shareable application might present a user interface to the user of the telecommunications device for providing additional features and functions, such as for enabling the user to control the function of the shareable application in response to detecting a predetermined condition in the voice communication channel. However, it should be noted that in other implementations, the shareable application does not have to monitor the conversation. Instead, other triggers or inputs, or actions by the user can cause the shareable application to carryout desired functions.

At block 1008, during the conversation, in some implementations, the shareable application may detect a predetermined condition in the voice communication. For example, the sharable application might detect a predetermined trigger or hook in the conversation or other aspect of the voice communication channel. In some implementations, for example, the shareable application might detect, such as via voice recognition functionality, a particular keyword or phrase spoken by one of the participants to the conversation, might detect a laugh, cough, sigh, or other noise made by one of the participants, or the like, and recognize this detected condition in the conversation as a trigger or hook specified as a predetermined condition for causing the shareable application to carry out a predetermined function. In other implementations, the shareable application may receive a different type of input from the user or detect a different type of triggering event. For example, the user might press a button on a user interface to cause the shareable application to carry out some function.

At block 1010, as a result of detecting the hook or predetermined condition in the conversation, or receiving an input or other detected trigger or action of the user, the shareable application carries out the predetermined function. For example, in some implementations, the shareable application might overlay a sound effect or a jingle on the conversation, cause an image, such as an emoticon or advertisement, or other data to be received or displayed by the first telecommunications device or transmitted to the second telecommunications device, or carry out some other function, as discussed further below. After the shareable application has carried out the predetermined function, the process may return to block 1006, and the shareable application continues to monitor the conversation or waits for additional user inputs or other trigger events for performing additional such functions until the voice communication is terminated.

Figure 11:
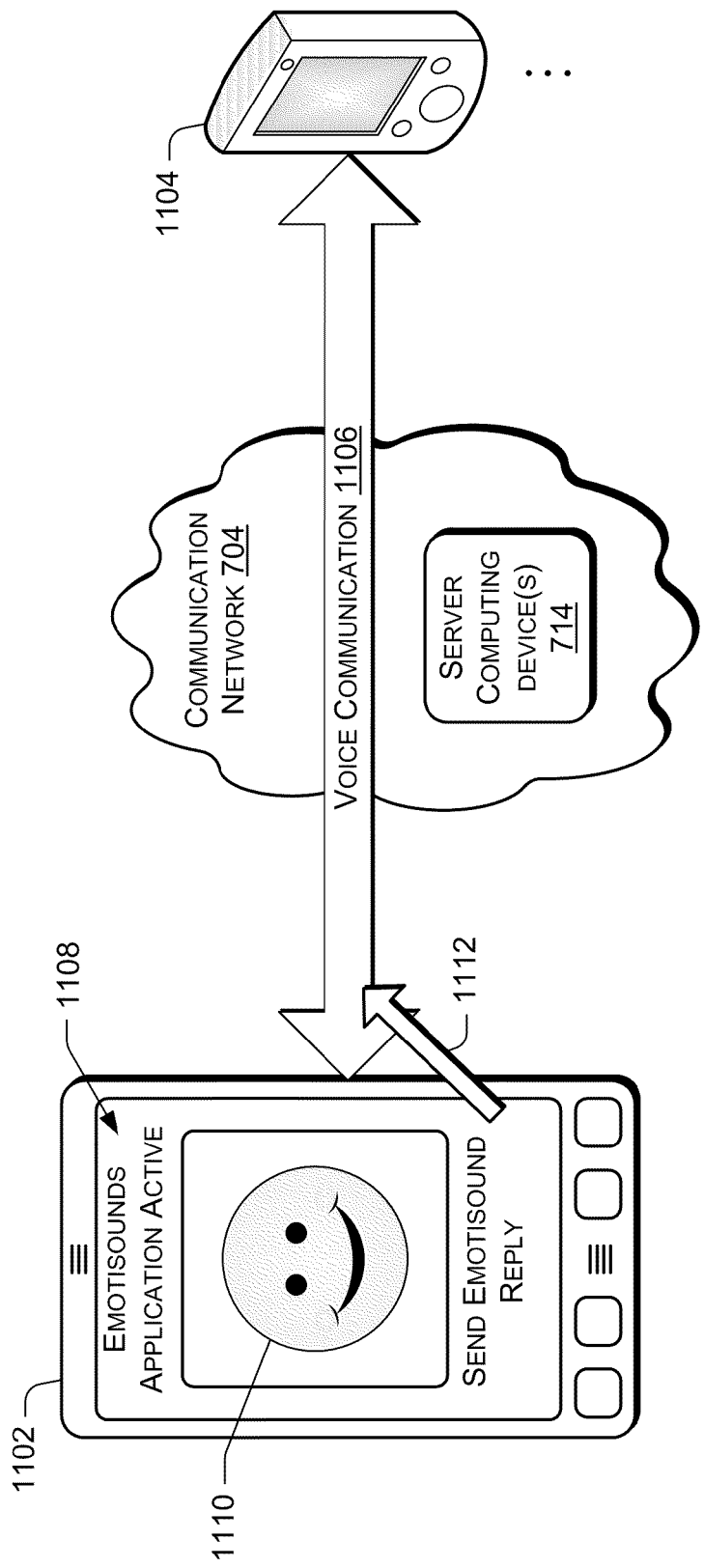
FIG. 11 illustrates an exemplary implementation of a unilateral shareable application.

FIG. 11 illustrates an exemplary implementation of a unilateral shareable application. In this implementation, a voice communication session is established between a first user using a first telecommunications device 1102, and a second user using a second telecommunications device 1104. For example, the first user may call the second user, or vice versa, over a communications network as discussed above with reference to FIG. 7, so that a voice communication channel 1106 is established between the first telecommunications device 1102 and the second telecommunications device 1104.

Figure 16A:
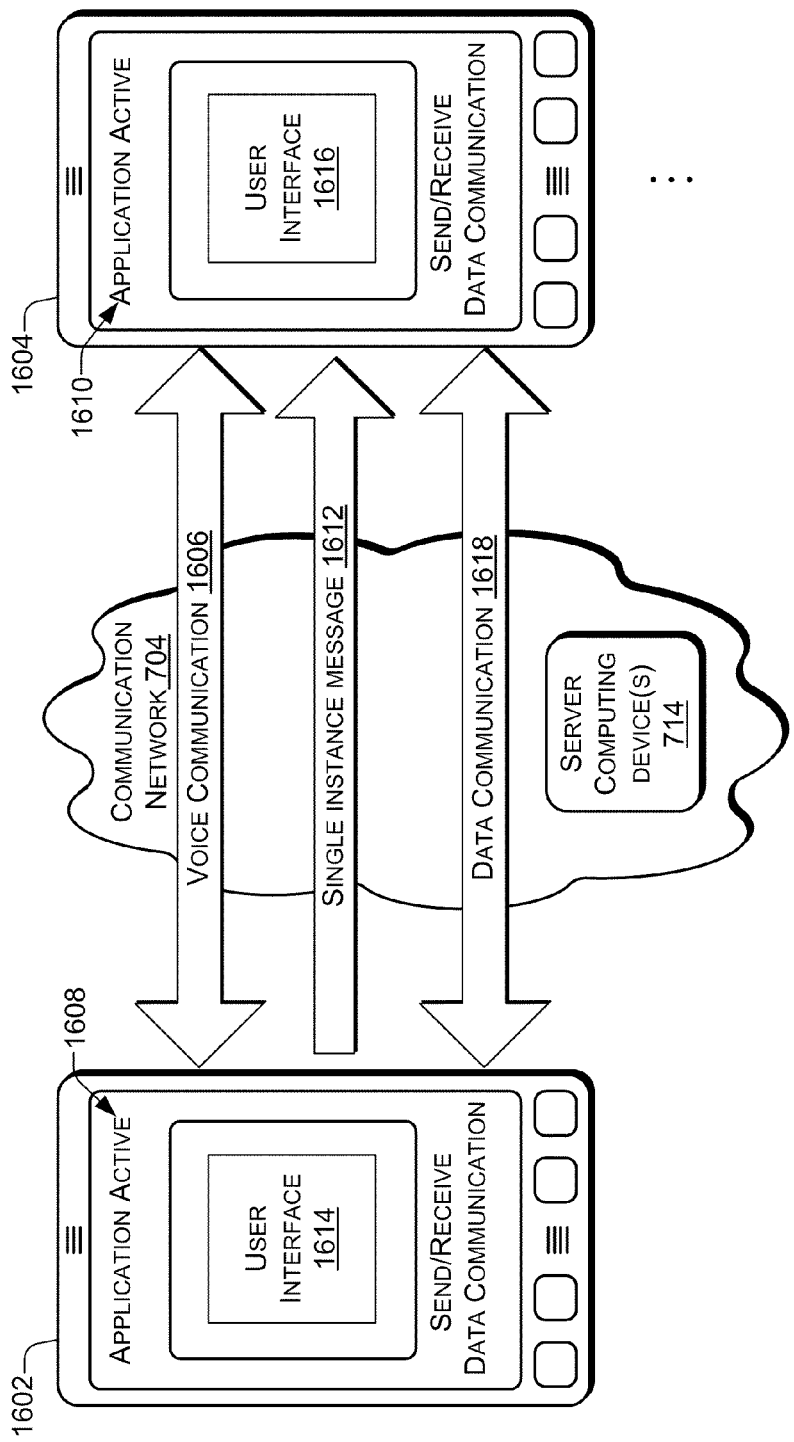
FIG. 16A illustrates an exemplary implementation of a bilateral shareable application.

For discussion purposes, suppose the first telecommunications device 1102 has a unilateral shareable application 1108 loaded in memory and executing on a processor of the telecommunications device 1102 (e.g., see FIG. 16A). Shareable application 1108 may include a user interface 1110 to give the user control over the functions of the shareable application 1108. In the illustrated implementation, the shareable application 1108 monitors the voice communication channel 1106 between the first telecommunications device 1102 and the second telecommunications device 1104. When the shareable application 1108 detects a particular sound, keyword, phrase, noise, or the like, as previously specified by the user of the telecommunications device 1102 or by a preset in the shareable application 1108 itself, the shareable application 1108 performs a predetermined function in response. For example, the shareable application 1108 may overlay a sound effect 1112 on the voice communication channel 1106 in response to detecting something in the voice conversation. The sound effect may be practically anything, including, for example, a line from a movie, an unusual or celebrity laugh, a musical clip, a jingle, an advertisement, or the like. For instance, during the conversation, either user might laugh, which is detected by application 1108 as a specified hook to cause application 1108 to overlay a predetermined sound effect 1112 (e.g., a laugh track) on the conversation. Accordingly, application 1108 can detect the predetermined condition either from the first user's voice communication received through the microphone of the first telecommunications device 1102 or from the second user's voice communication received at the first telecommunications device through the voice communication channel 1106 from the second telecommunications device 1104. As another example, the trigger event may be a non-voice-related event, such as the initial connection of the call to the second telecommunications device 1104. For example, when the second telecommunications device 1104 answers the call, the shareable application 1108 detects that the call has been connected, and sends a welcome or hello message or sound effect. Thus, in these examples, shareable application 1108 automatically augments the call and/or conversation with sound effects or other sound input without any additional action required of either user of either of the telecommunications devices 1102, 1104.

In some implementations, the shareable application 1108 may carry out a function solely on the first telecommunications device 1102. In this case, the sound effect 1112 might only be audible to the first user of the first telecommunications device 1102. In other implementations, the shareable application may send data to, or retrieve from, the other device. In such cases, the sound effect 1112 might be audible only to the second user of the second telecommunications device 1104, or audible to both users. In yet other implementations, the shareable application may interact directly with the voice communication channel so that the sound effect is heard on the voice channel by both users as a shared effect generated by the first telecommunications device 1102.

Furthermore, in other implementations, the server computing device(s) 714 on the communications network 704 may provide the functionality of detecting triggers in the conversation and adding sound effects to the conversation, or the like. For example, when the shareable application 1108 becomes active on the telecommunications device 1102, the shareable application can notify a counterpart application on the server computing device to become active and carryout the monitoring and sound effect integration functions. Other variations will also be apparent in view of the disclosure herein.

Figure 12:
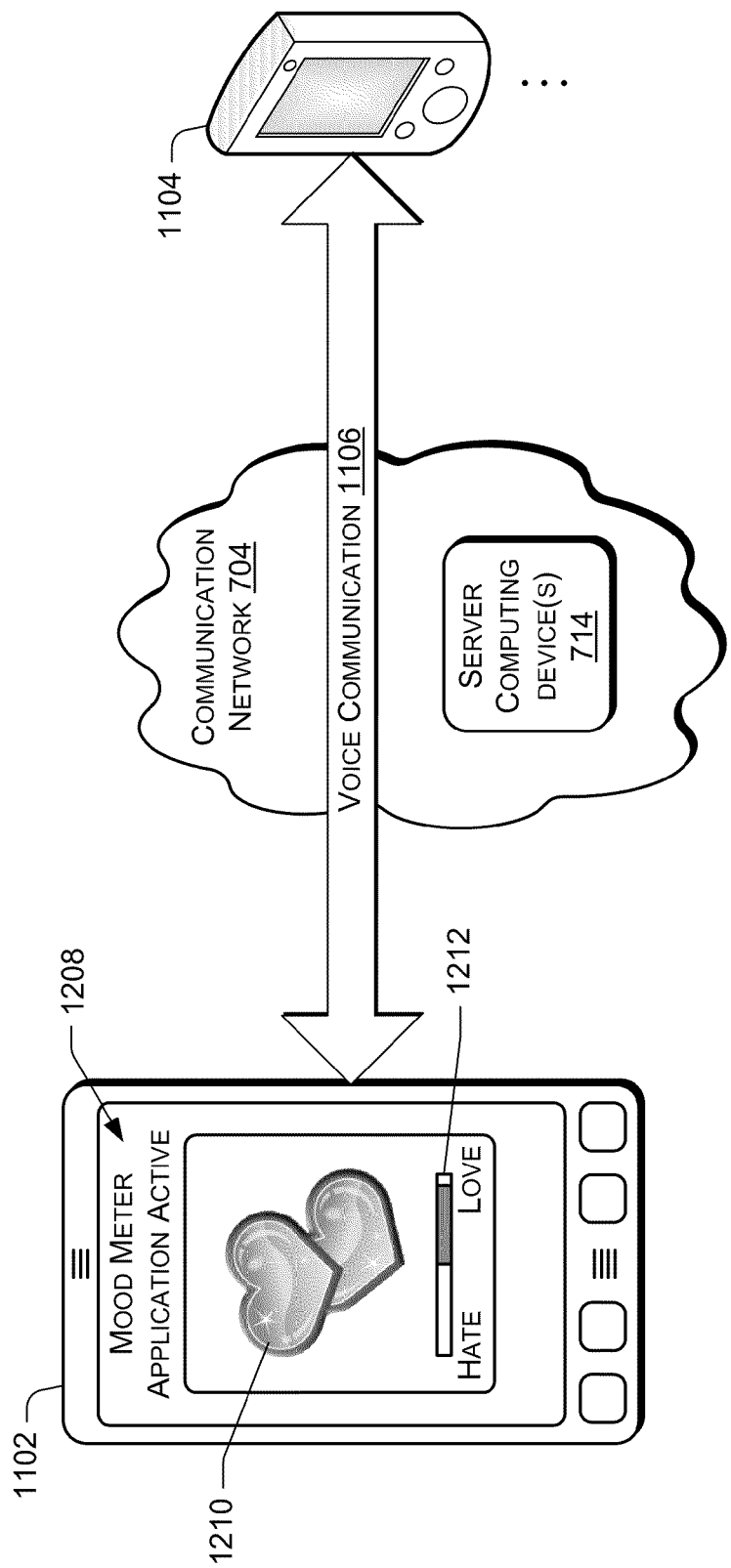
FIG. 12 illustrates another exemplary implementation of a unilateral shareable application.

FIG. 12 illustrates another exemplary implementation of a unilateral shareable application. In this implementation, a voice communication session is established over the channel 1106 between a first user using the first telecommunications device 1102 and a second user using the second telecommunications device 1104, as discussed above in the previous implementation. A shareable application 1208 is loaded and executing on first telecommunications device 1102. This implementation of the shareable application 1208 provides a user interface 1210 that includes a mood meter or "happy" meter 1212. Application 1208 monitors the conversation between the first user and the second user for determining the attitude of the first user and the second user towards each other based on an analysis of the tone of the conversation, and reflects the results of this analysis on the meter 1212 such as by displaying a bar or other type of indicator as the meter 1212, and coloring in a portion of meter 1212 towards either a love position, hate position, or neutral position in the middle. In some implementations, application 1208 may include artificial intelligence to analyze the tone and inflection of the first user and the second user during the conversation for determining the attitudes of the users towards each other, and automatically update the meter 1212 accordingly. Furthermore, in other implementations, the server computing device(s) 714 on the communications network 704 may provide the functionality of analyzing the mood of the conversation and providing an indication of the mood to the telecommunications device. For example, when the shareable application 1208 becomes active on the telecommunications device 1102, the shareable application can notify a counterpart application on the server computing device to become active and carryout the monitoring and mood measuring functions. The mood measurements can be transmitted to the telecommunications device using a Session Initiation Protocol (SIP) message, or the like, as is discussed further below with reference to FIGS. 16B-16D.

Figure 13:
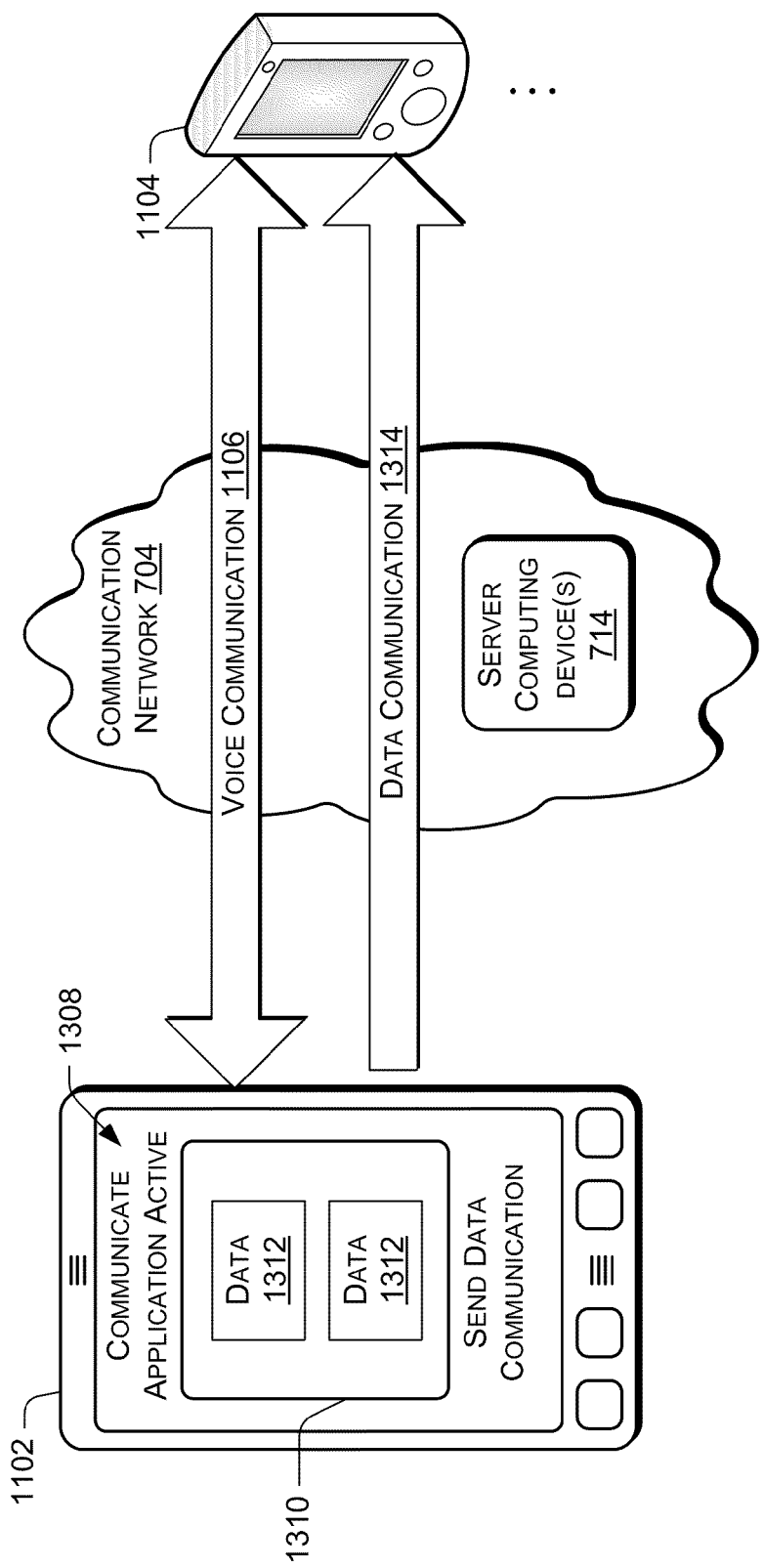
FIG. 13 illustrates another exemplary implementation of a unilateral shareable application.

FIG. 13 illustrates another exemplary implementation of a unilateral shareable application. In this implementation, a voice communication session is established over the voice communication channel 1106 between a first user using the first telecommunications device 1102 and a second user using the second telecommunications device 1104, as discussed above in the previous implementations. A shareable application 1308 is loaded and executing on first telecommunications device 1102. In this implementation, shareable application 1308 monitors the conversation between the first user and the second user, and automatically transmits predetermined data to telecommunications device 1104 upon detecting a hook, trigger or other predetermined condition in the conversation, such as a keyword, laugh, or other sound. For example, shareable application 1308 may include a user interface 1310 that displays one or more pieces of data 1312 such as icons, emoticons, photographs, or other suitable data. When the predetermined condition in the conversation is detected by the shareable application 1308, the shareable application 1308 identifies a predetermined piece of data 1312 that corresponds to the detected predetermined condition, and then sends the corresponding piece of data 1312 to the second telecommunications device 1104 as a data communication 1314. In some implementations, data communication 1314 may be in the form of a text message (e.g., SMS), picture message (e.g., MMS), instant message (IM) or other suitable data communication format. As a particular example, one of the users may laugh, and application 1308 detects the laugh and in response, sends an image of a smiley face emoticon to the second telecommunications device 1104 as a data communication 1104. Furthermore, in other implementations, the server computing device(s) 714 on the communications network 704 may provide the functionality of detecting triggers in the conversation and sending the data pieces 1312 in the data communication 1314. For example, when the shareable application 1308 becomes active on the telecommunications device 1102, the shareable application can notify a counterpart application on the server computing device 714 to become active and carryout the monitoring and data sending functions. Other variations will also be apparent in view of the disclosure herein.

In some additional implementations, a variety of user-selectable sounds and visuals may be initiated and shared between telecommunications devices 1102, 1104 via user initiation. For instance, if the user of telecommunications device 1102 wishes to respond to a comment made by the other user with a smiling emoticon, such as emoticon 1110, the user may initiate a process by which emoticon 1110 appears on the second telecommunications device 1104. In some implementations, emoticon 1110 consists of an image file resident on telecommunications device 1102, which may be transmitted to telecommunications device 1104 in the form of an MMS message, SIP message, or the like. The message would include, in one or more data fields accompanying the emoticon image, a predefined alphanumeric trigger which, upon receipt by telecommunications device 1104, would initiate the immediate presentation of emoticon 1110 on a display. In this manner may any type of multimedia content capable of transmission via MMS or SIP can be transmitted and presented on telecommunications device 1104.

Additionally, in some bilateral implementations, as described further below, presentable content, such as but not limited to emoticon images, may reside in the memory of each of telecommunications devices 1102, 1104. If the user of telecommunications device 1102 wishes to "send" an emoticon image to the user of telecommunications device 1104, the shareable application, upon receiving an input from the user can automatically initiate transmission of a SMS, MMS or SIP message to telecommunications device 1104, which message would incorporate a trigger, such as an alphanumeric trigger in one or more fields of such message. Upon receiving the message, the shareable application resident on the second telecommunications device 1104 would identify and recognize the trigger, associate the trigger with a particular emoticon image, and immediately present the particular emoticon image on the display of second telecommunications device 1104. By storing emoticons and other multimedia content in the memory of each of telecommunications device 1102, 1104, and triggering display of such content via messaging triggers rather than passing the actual image file, a telecommunications carrier can minimize network data traffic.

Figure 14:
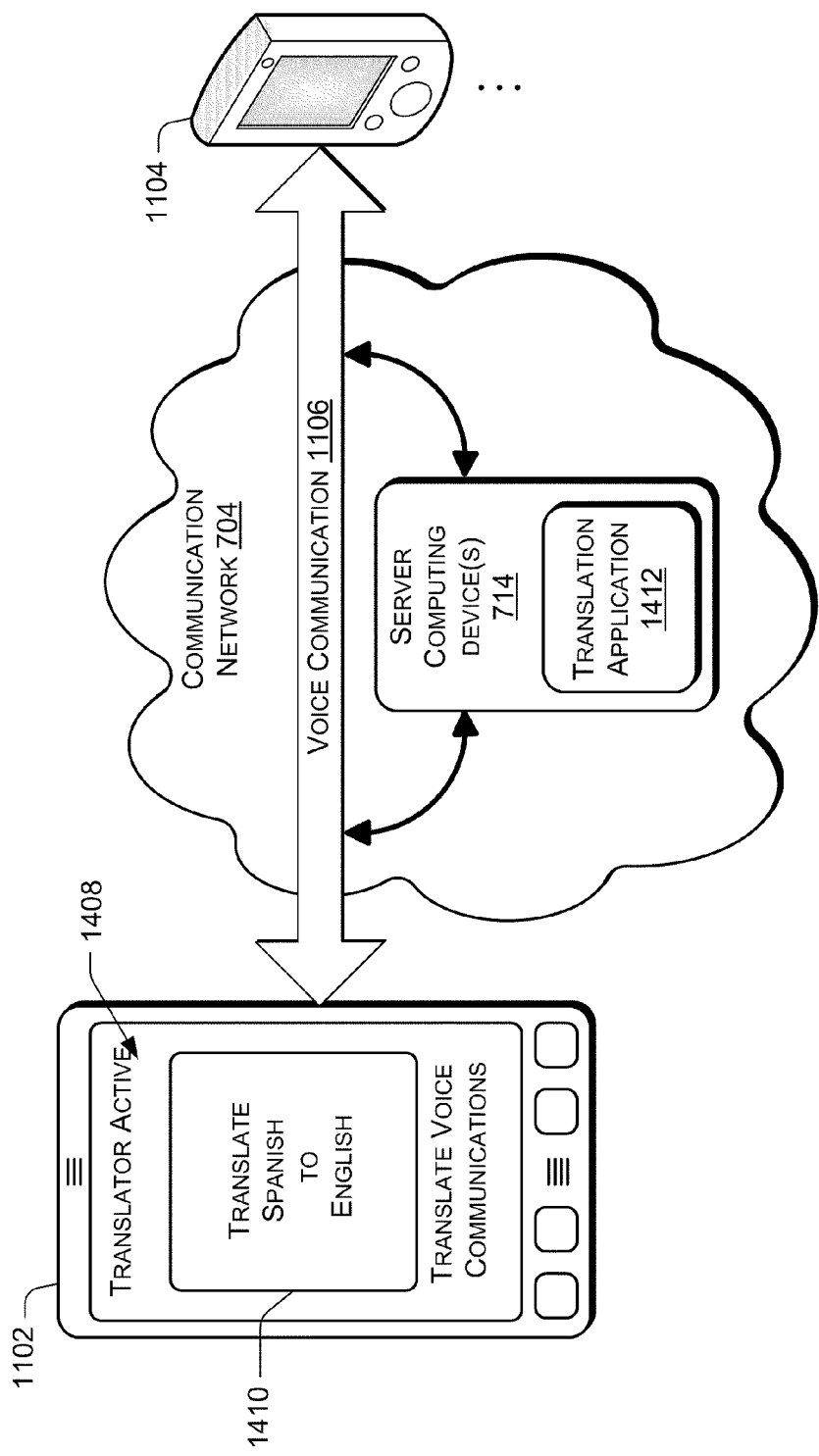
FIG. 14 illustrates another exemplary implementation of a unilateral shareable application.

FIG. 14 illustrates another exemplary implementation of a unilateral shareable application. In this implementation, a shareable application 1408 is loaded and executing on first telecommunications device 1102 to monitor the conversation between the first user and the second user, and automatically translates the conversation, or portions thereof, from one language to another. For instance, application 1408 may include a user interface 1410 that displays the language being spoken and the language into which the spoken language is to be translated. In some implementations, for example, if the user of the first telecommunications device 1102 is placing a call to the user of the second telecommunications device 1104 knowing that the user of the second telecommunications device speaks Spanish, while the first user speaks English, the user of the first telecommunications device 1102 may implement shareable application 1408 to translate outgoing communications from English to Spanish and translate incoming communications from Spanish to English. This may be carried out, for example, using voice recognition technology to recognize the incoming words in Spanish, perform the translation to English, and then use computer-generated speech to produce the translated English words in an audible format, with the outgoing communications being translated in a reverse manner. Further in some implementations, in addition to or instead of producing computer-generated speech, the translated words may be displayed in user interface 1410.

In addition, as discussed above, a server computing device(s) 714 on the network may facilitate the implementation of the translation application. For example, in order to take advantage of the greater processing power and memory of server computing device(s) 714, the voice recognition and translation can be carried out by a counterpart translation application 1412 executing on one or more of server computing devices 714. This would enable the translation to be carried out in much closer to real time than would be possible with a conventional telecommunications device having conventional processing power. Thus, when the shareable translation application 1408 becomes active on telecommunications device 1102, the translation application 1408 notifies the counterpart translation application 1412 on the server computing device(s) 714 to become active and carry out the actual voice recognition, translation and speech generation functions.

Further, in other implementations, the translation application 1408 may be a bilateral application in which each telecommunications device 1102, 1104 has an instance of the application active. For example, some parts of the application, such as computer speech generation may take place at each telecommunications device, while the voice recognition and translation portions may take place at the server computing device(s) 714. Other variations will also be apparent to those of skill in the art in light of the disclosure herein.

In other implementations, shareable application 1408 and/or counterpart translation application 1412 runs in the background, and, for example, when one or more non-English-language words are detected during a conversation between the first user of the first communication device 1102 and the second user of the second telecommunications device 1104, application 1408 or 1412 may automatically produce a computer-generated speech and/or written translation of the one or more non-English-language words into English, or whatever language the first user specifies.

While several exemplary implementations of unilateral shareable applications have been described above, it will be apparent to those of skill in the art that many other implementations are possible in view of the disclosure set forth herein, and that the implementations herein are not limited to the particular examples described. Additionally, while the unilateral applications have been described in the environment of a voice communication between a first telecommunications device and the second telecommunications device, it will be appreciated that some of the applications described herein can also be applied in other communication environments, such as a telecommunications device with a voice over IP device, a landline telecommunications device, or the like, in place of the second telecommunications device. Additionally, in some implementations, more than one shareable application can be executing on the telecommunications device, such as for monitoring the voice communications and/or performing desired functions.

Implementations of Bilateral Shareable Applications

Figure 15:
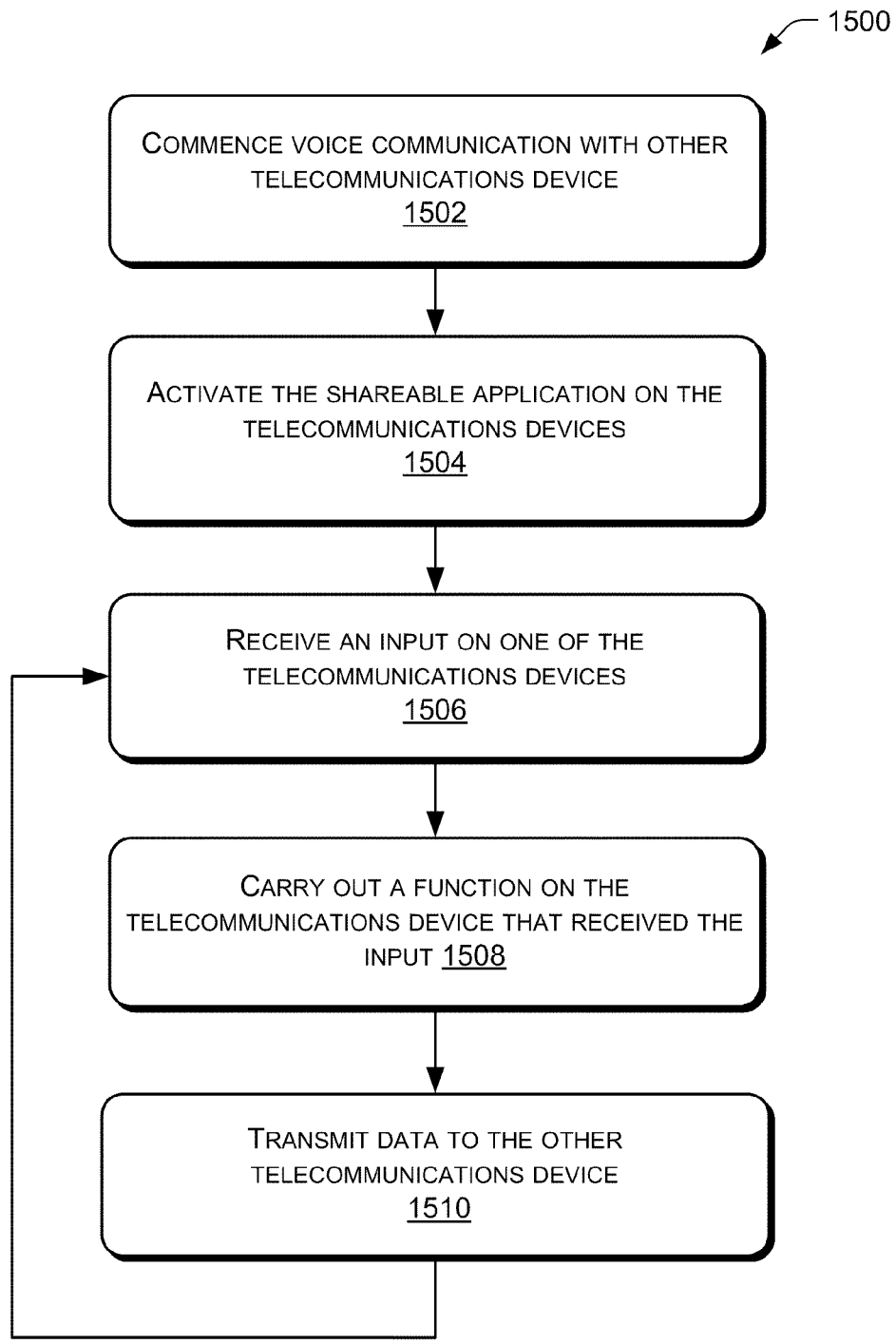
FIG. 15 illustrates a flow chart representing an exemplary process carried out in conjunction with execution of implementations of bilateral shareable applications.

FIG. 15 illustrates a flow chart representing an exemplary implementation of a process 1500 carried out in conjunction with execution of implementations of bilateral shareable applications on telecommunications devices. Parent and child applications 134 and 136 of FIG. 1 can be implemented as bilateral shareable applications.

At block 1502, a voice communication channel is established between two or more telecommunications devices for enabling voice communications to be carried out between the telecommunications devices. For example, one of the telecommunications devices may initiate an outgoing call, or receive an incoming call.

At block 1504, the shareable application is activated on two or more of the telecommunications devices that are connected by the voice communication channel. For example, each user might already have the shareable application installed on his or her telecommunications device. In other implementations, one of the users might encourage the other user(s) to install the application on their respective devices, so that the users are able to interact with each other via the shareable application. In yet other implementations, the application on one or both telecommunications devices may open automatically in response to a call being connected or other trigger event. For example, the application on one telecommunications device may run in the background and automatically recognize the phone number of the other telecommunications device as being a telecommunications device with which the shareable application has interacted in the past. The shareable application can automatically become active and initiate opening a data channel with the other telecommunications device, which may cause a shareable application on the other telecommunications device to also become active. Other variations will also be apparent to those of skill in the art in light of the disclosure herein. In any event, if the users decide that they would like to activate a shareable application, the first user activates an instance of the shareable application on the first user's telecommunications device and the second user activates a separate instance of the shareable application on the second user's telecommunications device while the voice communication channel remains open so that the users may continue to converse. In some implementations, the shareable application on each telecommunications device automatically establishes a data communication channel with the shareable application on the other telecommunications device that is party to the voice communication channel. However, in some other implementations, the users may elect not to have this interconnection between the applications, or the applications may not need an established data channel connection to operate.

At block 1506, the shareable application active on one of the devices receives an input. For example, the first user may make an input to a user interface of the first shareable application on the first telecommunications device, or the second user may make an input to the user interface of the second shareable application on the second telecommunications device.

At block 1508, the shareable application on the telecommunications device that receives the input carries out a corresponding function on the telecommunications device.

At block 1510, in some implementations, the shareable application on the telecommunications device that receives the input transmits data to the shareable application on the other telecommunications device. For instance, the shareable application that received the input might transmit instructions for instructing the shareable application on the other telecommunications device to also carry out a function. Then, for example, the shareable application on the other telecommunications device receives the instructions from the shareable application on the telecommunications device that received the user input, and carries out the corresponding function on the other telecommunications device in accordance with the instructions received from shareable application on the telecommunications device that received the user input.

Furthermore, in some implementations, the shareable applications may be more closely linked to each other via the data communication channel. For example, in some implementations, one of the shareable applications on one of the telecommunications devices may be a master application while the other shareable application on the other device may be controlled as a slave application, such that the user of the master telecommunications device controls the applications on both telecommunications devices. This may be useful, for example, in the some implementations, such as where a parent using the master telecommunications device is reading an e-book to a child using the slave telecommunications device.

Other examples in which such master-slave shareable applications are useful include an application for presenting slides, such as during a conference call or the like.

Further, in some applications in which the master-slave relationship is implemented, a toggle might be included for switching the role of master and slave between the telecommunications devices. For example, the user interface of each telecommunications device may include a switch or button displayed on the user interface, for switching one of the telecommunications devices from the master role to the slave role and vice versa. Additionally, in some implementations, the roles might be switched after a predetermined time, or upon the occurrence of a particular user input. For example, during a game, the role might be switched each time a player makes a move or chooses an option.

Additionally, in some implementations, the bilateral shareable applications produce a common visual display that is the same on each telecommunications device, while in other implementations, the bilateral shareable applications have no common space or shared environment. For example, as discussed above, if the user of the first telecommunications device wishes to "send" an emoticon image to the user of the second telecommunications device, whether this image is actually sent, or whether just an instruction to load a particular emoticon image is sent, this can be carried out using single instance messages, and thus, no shared or common environment is necessary. However, in other bilateral shareable applications, a common or shared space is created, such as for enabling the users to both view the same photograph simultaneously on each telecommunications device, or the like. In some implementations, each user is able to manipulate the common environment, while in other implementations, such as the master-slave implementations described above, only one of the users is able to manipulate the common environment at any one time. Other variations will also be apparent in light of the disclosure herein.

FIG. 16A illustrates an exemplary implementation of bilateral shareable applications. In the illustrated implementation, a voice communication session is established between two or more telecommunications devices, such as a first user using a first telecommunications device 1602, and a second user using a second telecommunications device 1604. For example, the first user may call the second user or vice versa, over a communications network as discussed above with reference to FIG. 7, so that a voice communication channel 1606 is established between the first telecommunications device 1602 and the second telecommunications device 1604. First telecommunications device 1602 may have a first bilateral shareable application 1608 loaded in memory and executing on the first telecommunications device, such as by being executed by one or more processors of the first telecommunications device, as discussed above with reference to FIGS. 8A-8B. Similarly, a second telecommunications device 1604 may have a second bilateral shareable application 1610 loaded in memory and executing on the second telecommunications device, such as by being executed by one or more processors of the second telecommunications device, as discussed above with reference to FIGS. 8A-8B. First application 1608 may include a first user interface 1614 to give the first user control over the functions of the first application 1608. Similarly, second application 1610 may include a second user interface 1616 to give the second user control over the functions of the second application 1610.

In the illustrated implementation, during the voice communication between the first user and the second user, the users decide to activate the application 1608, 1610 on their respective telecommunications devices 1602, 1604. In other implementations, as discussed above, the shareable application on one or both telecommunications devices may open automatically in response to a call being placed, received, connected or some other trigger event. In some implementations, after the application on each telecommunications device 1602, 1604 has been activated, the users may continue their conversation while each uses the application on their respective telecommunications device 1602, 1604, thereby sharing the experience of using the applications together while also conversing over the voice communication channel 1606. Additionally, in some implementations, as described above, a single instance message 1612 may be sent from one of the telecommunications devices 1602, 1604 to the other telecommunications device, such as in the example described above for causing an emoticon image to load on the other telecommunications device. As described above, the single instance message could be an SMS message, a MMS message, SIP message, or the like.

In some implementations, however, additional functions are obtained when a data communication channel 1618 is established between the shareable applications 1608, 1610 to facilitate more constant exchange of data. Thus, in these implementations, when the shareable applications 1608, 1610 have been activated, each shareable application may automatically locate and connect to the corresponding shareable application on the other telecommunications device connected by the voice communication channel 1606, thereby establishing the data communication channel 1618 between the first telecommunications device 1602 and the second telecommunications device 1604. Data communication channel 1618 may be established in a variety of different ways with no additional input or action required from the first or second user of telecommunications devices 1602, 1604. For example, each application 1608, 1610 on telecommunications devices 1602, 1604, respectively, may establish a connection with the Internet such as through the network service provider via the radio transceiver interface, or through a Wi-Fi or other connection, if available. Then, each telecommunications device may determine its own IP address, and either transmit this address to the other telecommunications device or request the network service provider to transmit the IP address to the other telecommunications device or obtain the IP address from the other telecommunications device. For example, in one implementation, the IP addresses may be exchanged over the voice communication channel itself using key tones or other communication techniques. In another implementation, the application can request the network service provider servers provide the respective IP addresses of each telecommunications device 1602, 1604 to the other telecommunications device. This process is simplified when both telecommunications devices are using the same wireless network. However, when first telecommunications device 1602 is on a first wireless network and second telecommunications device 1604 is on a second wireless network, the exchange of IP addresses may still be accomplished by using an IP multimedia system operated by each respective wireless network. Once the data communication channel 1618 has been established by the exchange of IP addresses the applications 1608, 1610 are able to interact with each other and exchange data with each other for carrying out a multiplicity of functions and operations, some examples of which are provided below.

Figure 16B:
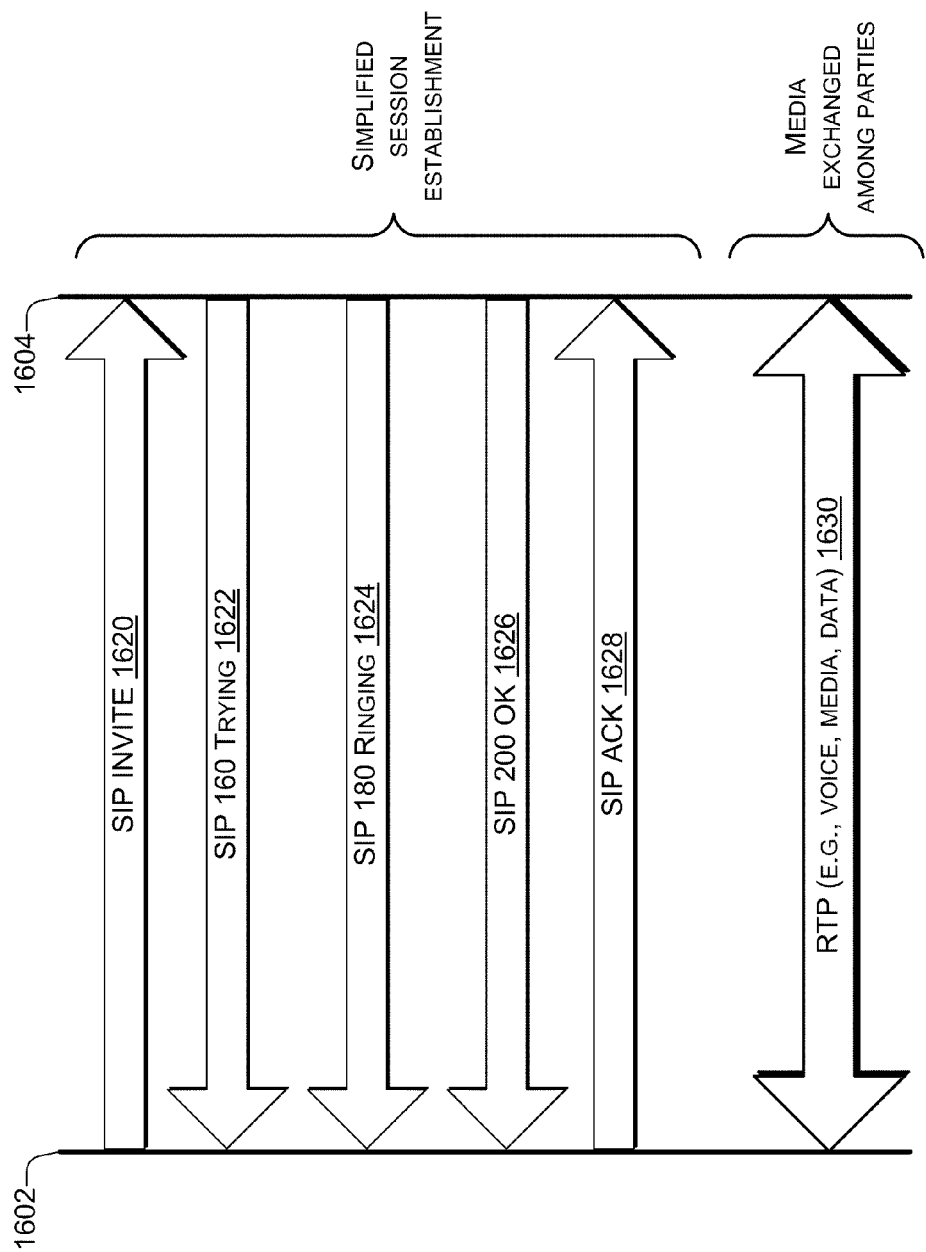
FIG. 16B illustrates an exemplary implementation of establishing a connection for a shareable application.
Figure 16C:
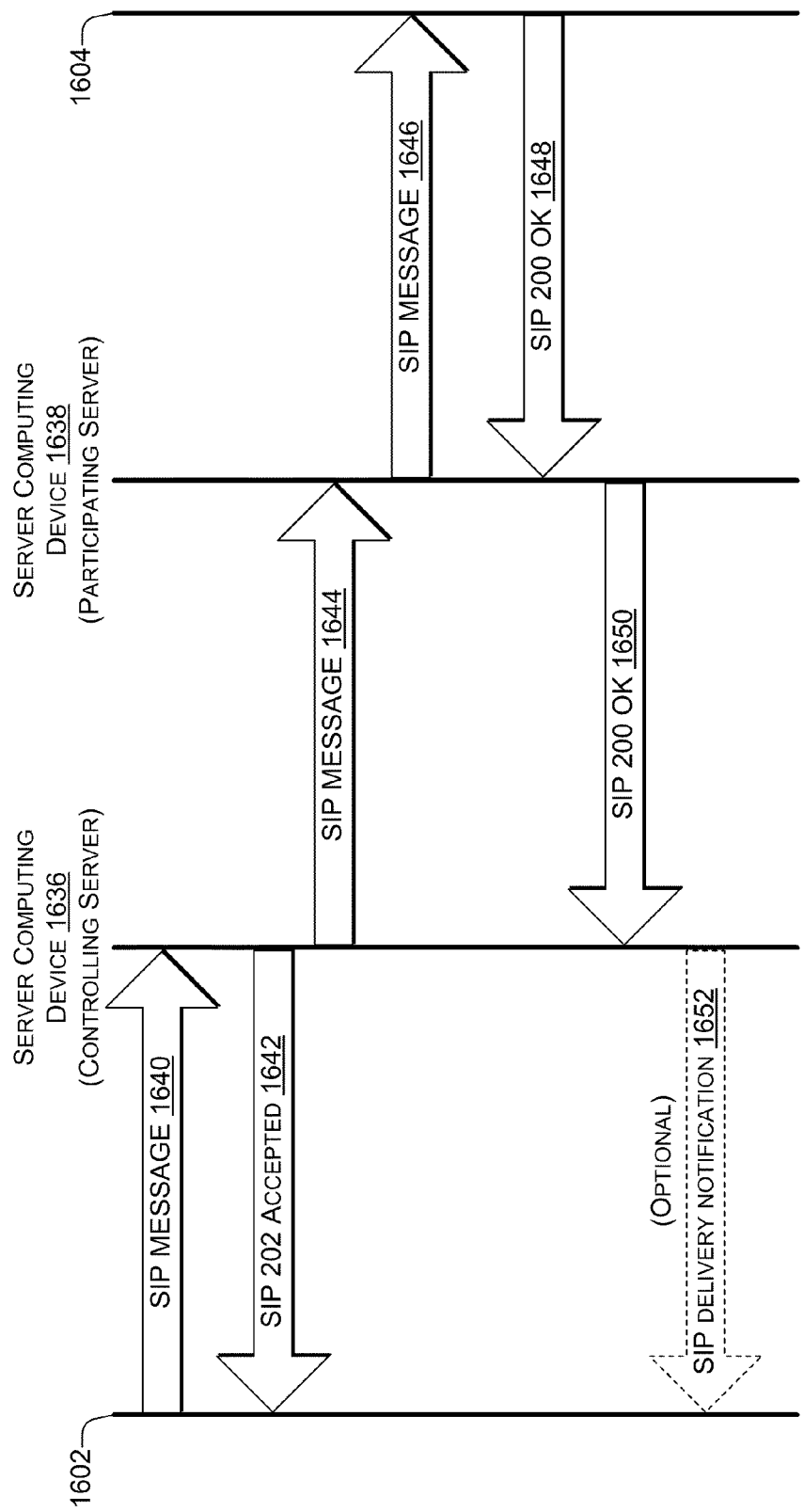
FIG. 16C illustrates another exemplary implementation of establishing a connection for a shareable application.

FIGS. 16B-16D set forth several additional exemplary processes for enabling data communication between two or more telecommunications devices 1602, 1604, such as for single instance messaging or for opening a data channel for exchange of data, instructions, or the like. For example, Session Initiation Protocol (SIP), as defined by the Internet Engineering Task Force (IETF) Network Working Group, can be used for exchanging data and/or establishing several types of connections between two or more telecommunications devices. SIP is a signaling protocol that is typically used for enabling multimedia communication sessions, such as voice and video calls over Internet Protocol (IP). SIP is part of the IP Multimedia Subsystem (IMS) established as a framework for enabling access to multimedia and voice applications from wireless and wired line devices. The SIP protocol can be used for creating multiparty sessions consisting of one or several communication or data streams.

In the implementation illustrated in FIG. 16B, after the voice communication channel 1606 is established between the telecommunications devices 1602, 1604, SIP can be used to establish Real-time Transport Protocol (RTP) communication between the two or more telecommunications devices. It should be noted that SIP/IMS registration is performed prior to this message exchange, as defined in RFC 3261 by the IETF and as refined by 3GPP (3rd Generation Partnership Project) as part of IMS. In the simplified message exchange illustrated, a SIP INVITE message is sent from one of the telecommunications devices 1602 to the other telecommunications device 1604 via the communications network 704. In response, the second telecommunications device 1604 sends a SIP 100 Trying message 1622, a SIP 180 Ringing message 1624, and then a SIP 200 OK message 1626 when the connection is established. The first telecommunications device 1602 sends back a SIP ACK message 1628 to acknowledge the session establishment. Once the SIP session is established, the telecommunications devices 1602, 1604 can exchange a variety of data via RTP 1630. For example, audio files, video, images, instructions, or other data may be exchanged using RTP.

FIG. 16C illustrates an alternative implementation in which independent messages can be sent using SIP without actually having to establish a session between the two or more telecommunications devices 1602, 1604. This implementation may be referred to as a "pager mode", and makes use of one or more server computing devices 1636, 1638, which may correspond to server computing device(s) 714 discussed above, and which may be NSP servers, or the like. The first telecommunications device 1602 sends a message as a SIP message 1640. The SIP message is received by a first server computing device 1636 as the controller server and the first server computing device sends back a SIP 202 accepted message 1642 as an acknowledgment to the first telecommunications device 1602. The first server computing device passes the message as a SIP message 1644 to a second server computing device 1638 as the participating server in communication with the second telecommunications device 1604. The second server computing device 1638 passes the message as SIP message 1646 to the second telecommunications device 1604. Since a call is in progress between the two telecommunications devices, the message is not deferred. The second telecommunications device 1604 sends back a SIP 200 OK message 1648 to the second server computing device 1638 to acknowledge the receipt of the message, and the second server computing device 1638 passes the acknowledgment as SIP 200 OK message 1650 to the first server computing device 1636. The first server computing device 1636 may optionally send a SIP delivery notification message 1652 to the first telecommunications device 1602. The message received by the second telecommunications device 1604 may be used for various different uses in shareable applications, such as providing instructions from a shareable application on one telecommunications device to a shareable application on a second telecommunications device.

FIG. 16D illustrates another implementation in which SIP is used to set up a Message Session Relay Protocol (MSRP) session. MSRP is conventionally used for transmitting instant messages. However, in implementations herein, shareable applications can use MSRP to transmit data including arbitrarily large and independent instant messages that can be used to transfer large files, such as media files. A SIP INVITE message 1660 is sent from the first telecommunications device 1602 to the second telecommunications device 1604. The second telecommunications device 1604 responds with a SIP 200 OK message 1662. The first telecommunications device 1602 responds with a SIP ACK message 1664 to acknowledge that the session is established. The first telecommunications device 1602 sends an MSRP SEND message 1666 that includes the data desired to be transferred to the second telecommunications device 1604. The second telecommunications device 1604 sends back an MSRP 200 OK message 1668 to acknowledge receipt of the message. Once the message has been transferred from the sender to the receiver, the MSRP session is closed. Accordingly, the foregoing sets forth several examples of implementations for exchanging data between telecommunications devices during an ongoing voice communication. Further, while exemplary implementations have been described for enabling data communication during an ongoing voice communication, other implementations are also possible, and the disclosure is not limited to the specific examples described herein.

Figure 17:
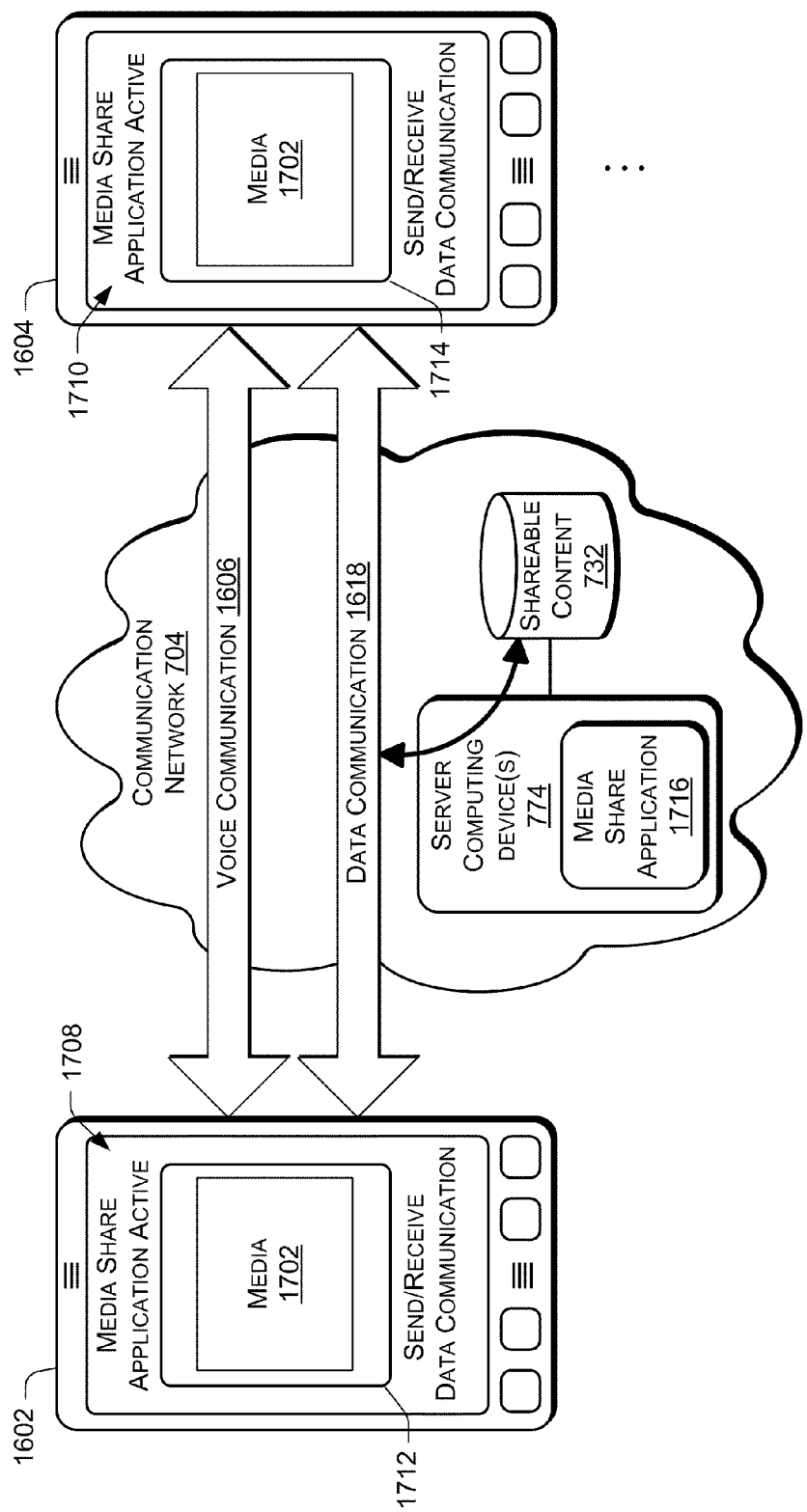
FIG. 17 illustrates another exemplary implementation of a bilateral shareable application.

FIG. 17 illustrates an example of an implementation of a bilateral shareable application which enables a first user and the second user to simultaneously view and/or listen to media 1702, such as such as photographs, music, videos, or the like, while carrying on a voice conversation. For example, once the data communication channel 1618 is established between the first media shareable application 1708 and the second media shareable application 1710, one of the applications 1708, 1710 may transmit one or more media files, such as a photograph to the other application so that both users are able to view the same photograph simultaneously while discussing the photograph over the voice communication channel 1606. As illustrated in FIG. 17, media 1702, such as a photograph, video, cover art, or the like, is displayed on a user interface 1712, 1714, respectively, of both the first telecommunications device 1602 and the second telecommunications device 1604.

Furthermore, the shareable applications 1708, 1710 may interact with a corresponding shareable application module 1716 on the server computing device(s) 714. For example, when media shareable applications 1708, 1710 become active on the telecommunications devices 1602, 1604, respectively, media share application 1716 on server computing device(s) 714 may manage and coordinate the transmission of shareable content to each of the telecommunications devices 1602, 1604. For instance, if the first user of first telecommunications device 1602 wants to share media, such as photographs, music, videos or the like with the user of second telecommunications device 1604, the first user can store the media in storage accessible and/or managed by the server computing device(s) 714. Thus, an online website, or other storage site may be used to store the shareable content. Then, when sharing the content, the shareable content 732 can be downloaded, served, streamed, or otherwise transmitted to each of the first and second telecommunications devices in a coordinated manner so that each user receives the shareable content at the same or substantially the same time. In this manner, the owner of the content does not have to use storage space on his or her telecommunications device for storing the content. Further, if the content is subject to digital rights management (DRM), the DRM provisions can also be enforced by the server computing device(s) 714.

As a specific example, in the case of photographs, the first user of the first telecommunications device may store a series of photographs online in shareable content 732. During a telephone conversation, the first user of first telecommunications device 1602 wants to share these photographs with the user of second telecommunications device 1604. The users each start up the media share shareable application 1708, 1710 on their respective telecommunications devices (or the media share applications may be started automatically). The media share application 1716 on the server computing device interacts with the applications 1708, 1710 on the telecommunications device, for transmitting and displaying the photographs sequentially on the respective user interfaces 1712, 1714. In some implementations, each user at each telecommunications device 1602, 1604 controls the user interface to determine when to move on to the next photograph. However, in other implementations of shareable application 1708, 1710, a master-slave relationship may be desirable between the shareable applications 1708, 1710. For example, the shareable application on the telecommunications device of the owner of the photographs (or from which the photographs are being transferred in the non-network storage implementation) may control the operation of the shareable application on the other telecommunications device that is receiving the photographs. Thus, the user of telecommunications device that owns the photographs, or that transfers photographs to the other telecommunications device can also control when each photograph is transferred or viewed so that each photograph may be discussed in turn. Furthermore, the photographs may be transferred one at a time, as they are discussed, or all the photographs may be transferred at once, and the applications 1708, 1710 are then used to control when each of the photographs are displayed. Other variations will also be apparent to those of skill in the art in light of the disclosure herein.

As another example, instead of photographs, images of slides for a presentation might be transferred from one telecommunications device to the other, or from shareable content 732. Thus, the user of one of the telecommunications devices 1602, 1604 is able to conduct a presentation of slides, or other images, to the user of the other telecommunications device 1602, 1604, while simultaneously describing the slides using the voice communication channel 1606. Similar to the photographs, the slides may be transferred as they are discussed, or may be transferred all at once and the applications 1708, 1710 can be coordinated to control the timing of the presentation of each slide 1702, such as via a master-salve relationship.

In yet another example, the shareable media content might be a movie or music track, or other media type that requires payment in order to view or hear. Thus, the server computing device(s) 714 could also charge the users, bill the users, and/or receive payment from the users of the first and/or second telecommunications devices 1602, 1604 for delivering the media content to the telecommunications devices 1602, 1604, respectively. The server computing device(s) 714 may also manage the digital rights for the media content, as discussed above. Further, in some implementations, the server computing device(s) 714 can handle backend conversion of the media content prior to downloading the content to the telecommunications devices, such as conversion of the media content to small-form-factor-compatible format, compression or decompression of the content, or other format compatible with a particular telecommunications device. Additionally, while the illustrated implementation shows the use of an established data communication channel, in other implementations, single instance messages, as described above, may be used in place of the established data communication channel 1618.

Figure 18:
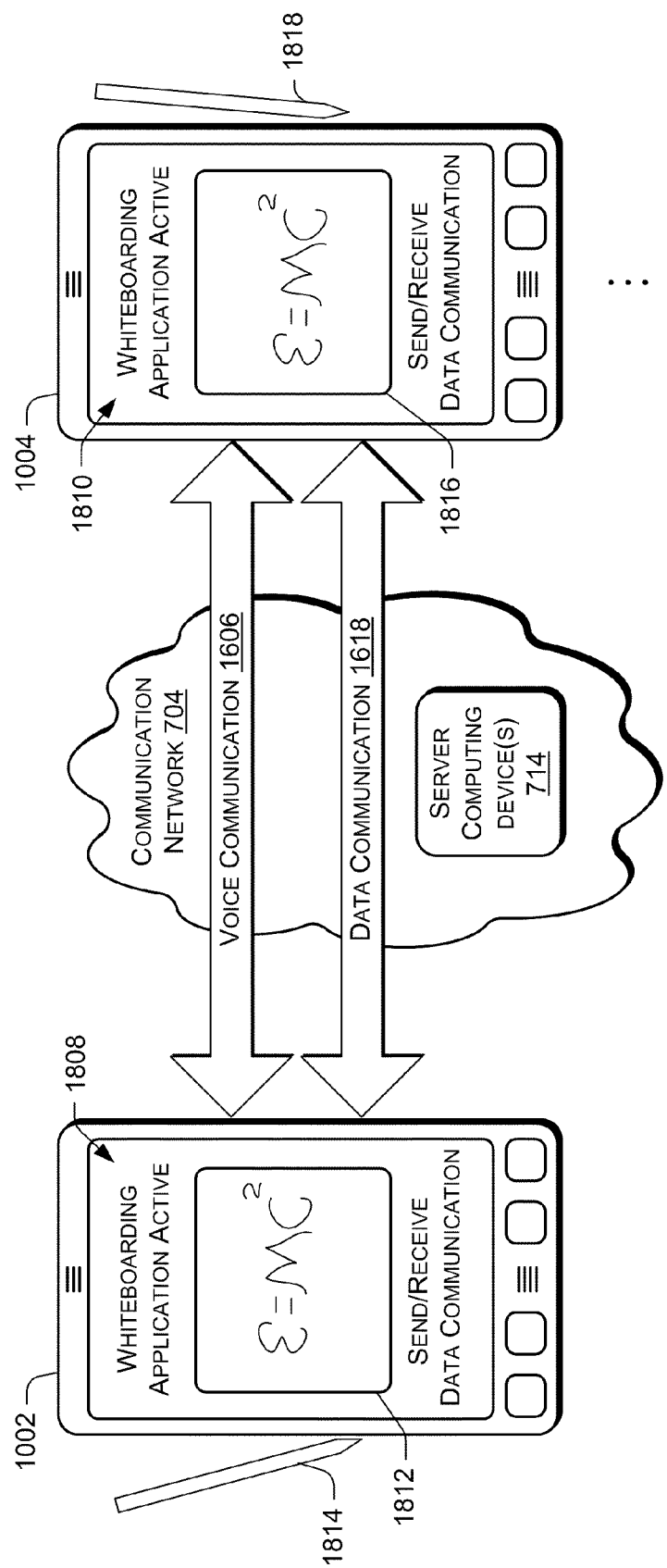
FIG. 18 illustrates another exemplary implementation of a bilateral shareable application.

FIG. 18 illustrates another example of an implementation of a bilateral shareable application. In this implementation, one or both of the telecommunications devices 1602, 1604 are equipped with a touchscreen and stylus for entering freehand inputs, and shareable applications 1808, 1810 may include whiteboarding capabilities. For example, the first telecommunications device 1602 includes a first whiteboarding user interface 1812 and first stylus 1814, and the second telecommunications device 1604 includes a second whiteboarding user interface 1816 and second stylus 1818. Further, in some implementations, a user's finger may serve as a stylus. Using the styluses 1814, 1818, one or both of the users are able to enter handwritten or other types of inputs that are automatically transmitted over the data communication channel 1618 and displayed on the whiteboard interface 1802, 1806, respectively, of the other telecommunications device 1602, 1604, respectively, while the users are simultaneously able to discuss the inputs over the voice communication channel 1606. Additionally, while the illustrated implementation shows the use an established data communication channel, in other implementations, single instance messages, as described above, may be used in place of the established data communication channel 1618. Further, in some implementations, server computing device(s) 714 may facilitate the shareable applications 1808, 1810, such as by storing the content created by the shareable applications 1808, 1810 in an online location for later access by the telecommunications devices 1602, 1604.

Figure 19:
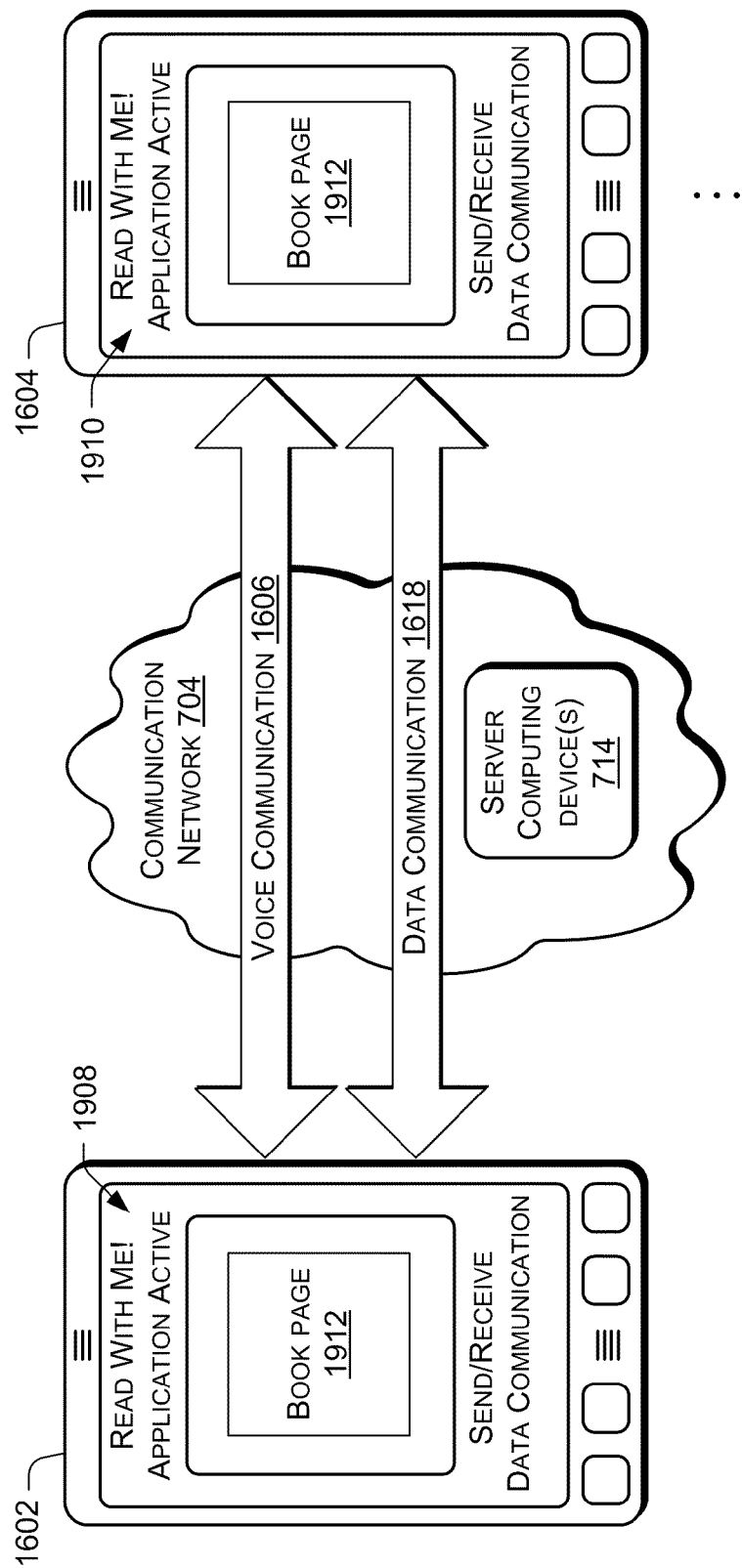
FIG. 19 illustrates another exemplary implementation of a bilateral shareable application.

FIG. 19 illustrates another example of an implementation of a bilateral shareable application. This implementation may be used in the scenario of FIG. 7, in which a parent can remotely read and navigate an e-book for a child.

In this example, the user of one of the telecommunications devices 1602, 1604 is able to read an electronic book to the user of the other telecommunications device 1602, 1604. For example, a parent who is out of town could use this shareable application to read a book to his or her child before bedtime. Thus, the shareable applications 1908, 1910 control the display of each page 1912 of the book on each telecommunications device 1602, 1604. This application also lends itself to a master-slave relationship for the applications 1608, 1610, so that the parent is able to control when the next page of the book is displayed on the child's telecommunications device. Additionally, while the illustrated implementation shows the use an established data communication channel, in other implementations, single instance messages, as described above, may be used in place of the established data communication channel 1618. Further, in some implementations, server computing device(s) 714 may facilitate the shareable applications 1908, 1910 such as by storing the book online and downloading the book pages to each telecommunications device upon receiving a command from one or the other of the shareable applications 1908, 1910.

Figure 20:
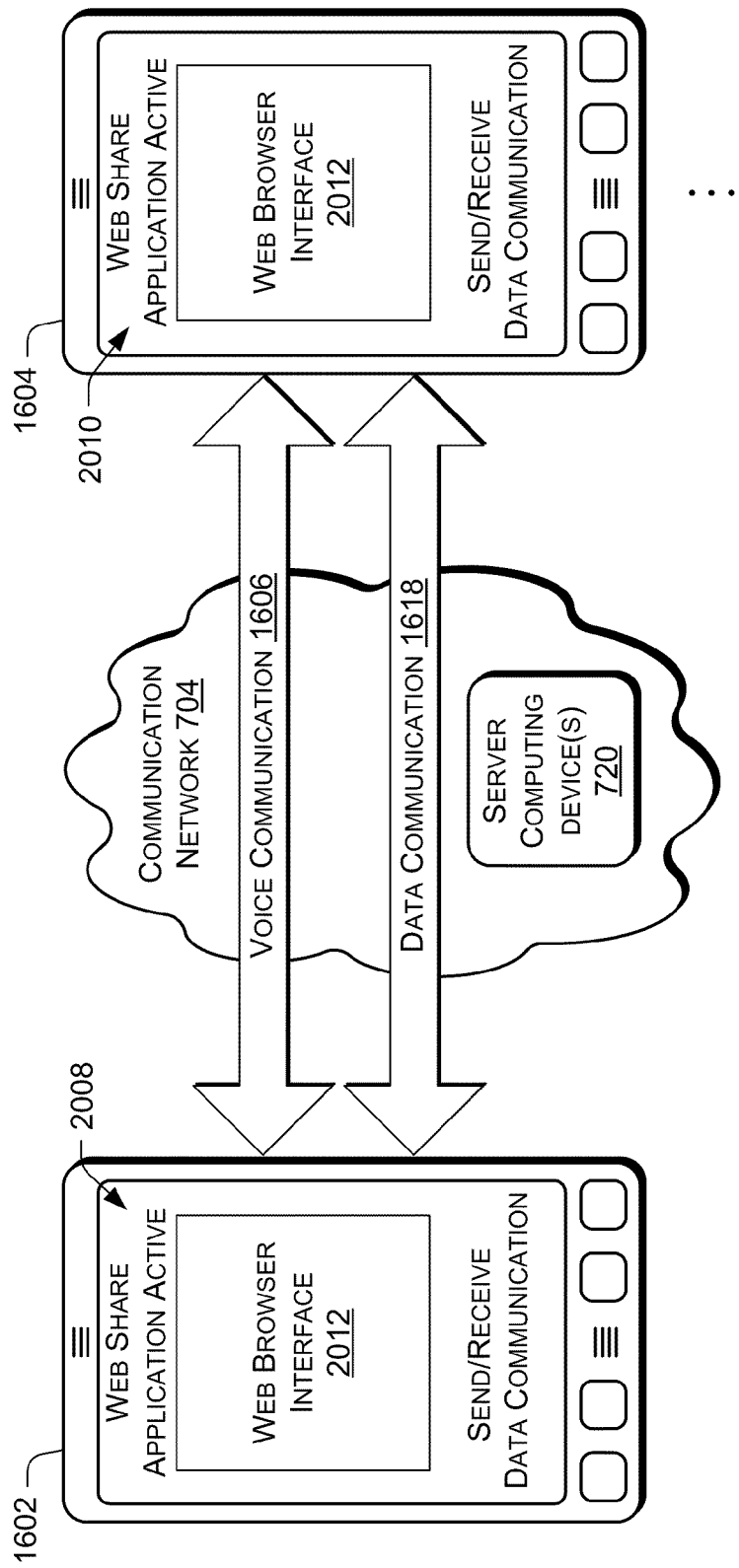
FIG. 20 illustrates another exemplary implementation of a bilateral shareable application.

FIG. 20 illustrates another example of a bilateral shareable application. In this example, the users of the telecommunications devices 1602, 1604 may decide that they would like to browse the Internet together while carrying on a conversation, such as for viewing one or more websites containing information in which they are interested. In this implementation, once the data communication channel 1618 is established, when one of the web browser interfaces 2012 is directed to a particular webpage by user input, the shareable application 2008, 2010 that received the input might automatically direct the web browser interface 2012 of the other telecommunications device to the go to the same webpage so that the users of both telecommunications devices 1602, 1604 are presented with the same webpage for viewing at the same time. In this implementation, either user might be able to direct the web browser, or a master-slave relationship might be established, as discussed above. Additionally, while the illustrated implementation shows the use an established data communication channel, in other implementations, single instance messages, as described above, may be used in place of the established data communication channel 1618. Further, in some implementations, server computing device(s) 714 may facilitate the shareable applications 2008, 2010, such as by converting the web content to a suitable form factor for each telecommunications device.

While several examples of bilateral shareable applications have been described, numerous other possible applications, such as games, business applications, and the like, will be apparent to those of skill in the art in light of the disclosure presented herein, and the disclosure herein is not limited to the particular examples illustrated. Furthermore, although the implementations of the unilateral and bilateral shareable applications are presented in this disclosure as applying to voice communications between two telecommunications devices, it should be noted that more than two telecommunications devices may be connected for voice communication while also being connected for data communication via a data communication channel, or the like. For example, three or more telecommunications devices might be connected by a voice channel in a conference call while shareable applications on each of those telecommunications devices are linked via a data communication channel. Additionally, in some implementations, more than one shareable application can be executing on each telecommunications device and communicating with corresponding applications on one or more other telecommunications devices.

Figure 21:
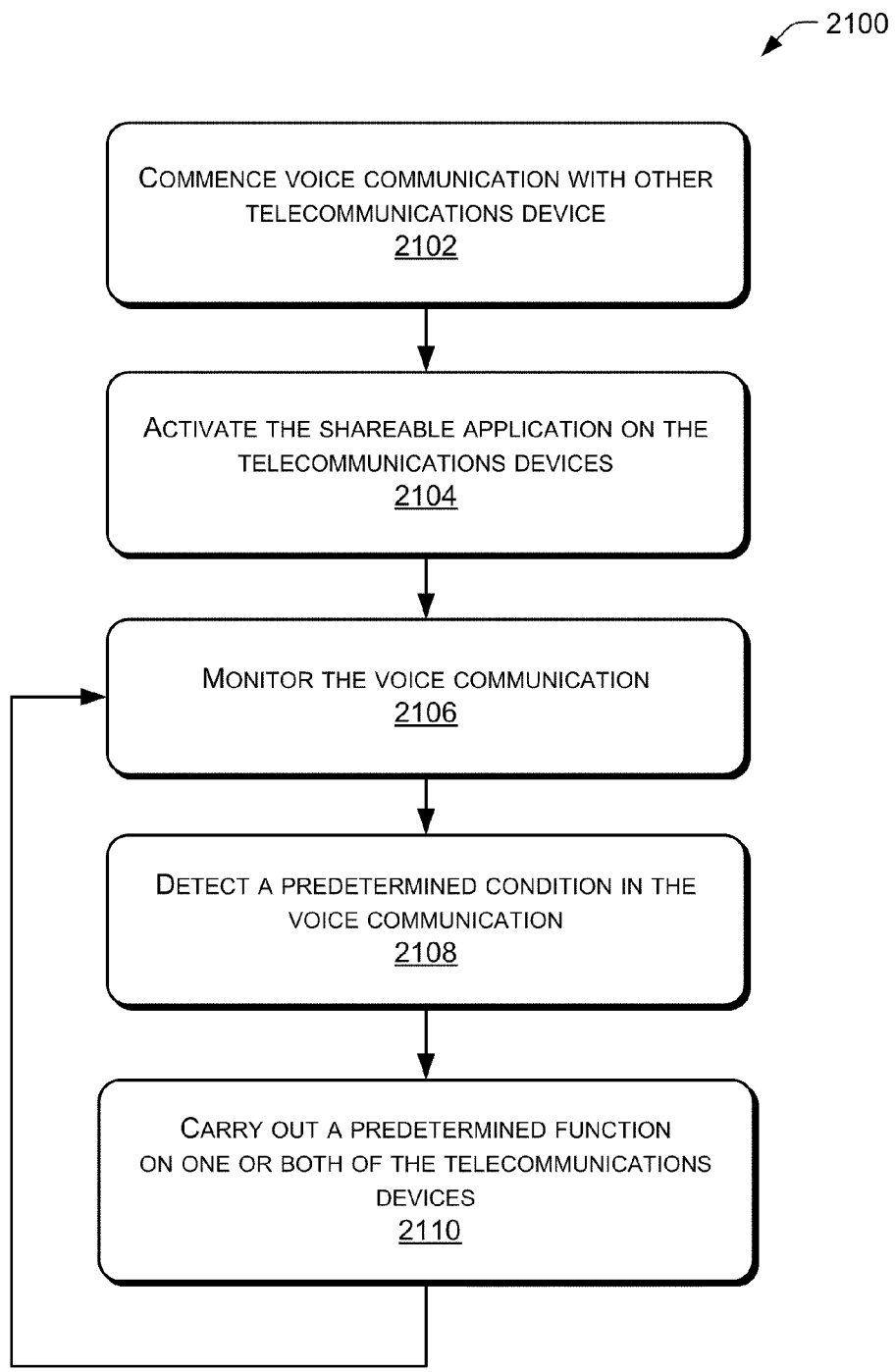
FIG. 21 illustrates a flow chart representing an exemplary process carried out in conjunction with execution of additional implementations of bilateral shareable applications.

FIG. 21 illustrates a flow chart representing an exemplary implementation of a process 1500 carried out in conjunction with execution of additional implementations of bilateral shareable applications on telecommunications devices. In these additional implementations, the applications on the telecommunications devices are able to interact with each other and/or also interact with the voice communication channel established between the telecommunications devices.

At block 2102, a voice communication channel is established between a plurality of telecommunications devices for enabling voice communications to be carried out between the telecommunications devices. For example, one of the telecommunications devices may initiate an outgoing call, or receive an incoming call.

At block 2104, the shareable application is activated on two or more of the telecommunications devices that are connected by the voice communication channel. For example, each user might already have the shareable application installed on their telecommunications device. In other implementations, one of the users might encourage the other user to install the application on their respective device so that the users are able to interact with each other via the shareable application. In any event, the users decide that they would like to activate a shareable application, and a first user activates an instance of the shareable application on the first user's telecommunications device and a second user activates an instance of the shareable application on the second user's telecommunications device. Alternatively, one or both of the shareable applications might activate automatically in response to a triggering event, such as connection of a voice call, or the like, as discussed above. In some implementations, the shareable application on each telecommunications device will automatically establish a data communication channel with the sharable application on the other telecommunications device that is party to the voice communication channel. However, in other implementations, a data communication channel might not be established, and each shareable application will operate independently of the other as with the unilateral shareable applications described above.

At block 2106, in some implementations, the shareable application on one or both of the telecommunications devices monitor the voice communication between the telecommunications devices. For example, the shareable applications monitor a conversation carried on between the first user and the second user over the voice communication channel. In some implementations, the shareable applications may run in the background and only become apparent when a predetermined condition or hook is detected. In other implementations, the shareable applications might present a user interface to the user of the telecommunications device for providing additional features and functions. Further, in some implementations, a counterpart shareable application on the server computing device(s) 714 may monitor the conversation instead of or in addition to the shareable applications on the telecommunications devices.

At block 2108, in some implementations, a predetermined condition is detected in the voice communication. For example, during monitoring of the conversation, the shareable application on the first user's device or on the second user's device detects a predetermined condition or hook in the conversation. In some implementations, for example, the application might detect a particular keyword or phrase spoken by one of the participants in the conversation, might detect a laugh or other noise made by one of the participants, or the like, and recognize this detected condition in the conversation as a trigger or hook for causing the application to carry out a predetermined function.

At block 2110, as a result of detecting the hook or predetermined condition in the conversation, at least one of the shareable application instances on the telecommunications devices or on the server computing device(s) 714 carries out a predetermined function on one or both of the telecommunications devices. For example, in some implementations, the shareable application might overlay a sound effect or jingle on the conversation, might cause a picture or advertisement to be transmitted to the first or second user via the data communication channel, might cause an application user interface to present a certain view or perform a certain function, or the like. After the shareable application has carried out the predetermined function, the process may return to block 2108, and the shareable applications may continue to monitor the conversation for performing additional such functions until the conversation is terminated.

Figure 22:
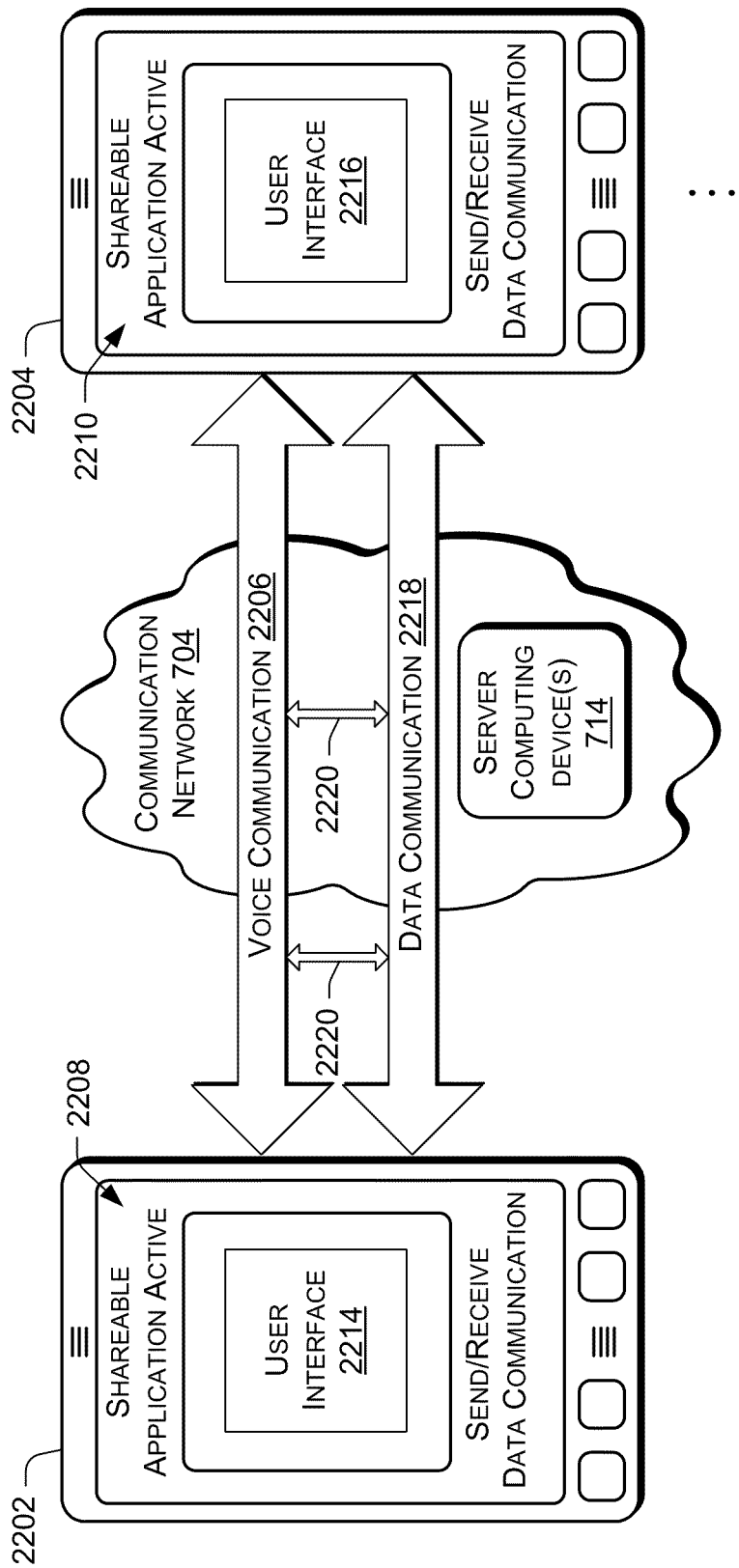
FIG. 22 illustrates an exemplary implementation of the additional implementations of bilateral shareable applications.

FIG. 22 illustrates an exemplary implementation of a bilateral shareable application that also interacts with a voice communication channel. In this implementation, a voice communication session is established between a first user using a first telecommunications device 2202, and a second user using a second telecommunications device 2204. For example, the first user may call the second user, or vice versa, over a communications network, as discussed above with reference to FIG. 7, so that a voice communication channel 2206 is established between the first telecommunications device 2202 and the second telecommunications device 2204.

First telecommunications device 2202 may have a first bilateral shareable application 2208 loaded in memory and executing on the first telecommunications device, such as by being executed by one or more processors of the first telecommunications device as discussed above with reference to FIGS. 8A-8B. Similarly, second telecommunications device 2204 may have a second bilateral shareable application 2210 loaded in memory and executing on the second telecommunications device, such as by being executed by one or more processors of the second telecommunications device as discussed above with reference to FIGS. 8A-8B. First application 2208 may include a first user interface 2214 to give the first user control over the functions of the first application 2208. Similarly, second application 2210 may include a second user interface 2216 to give the second user control over the functions of the second application 2210.

As discussed above with reference to the examples of FIGS. 16-20, a data communication channel 2218 may be established between the first application 2208 and the second application 2210. In these implementations, the data communication channel 2218 is interactive with the voice communication channel 2206, as illustrated by arrows 2220. For example, applications 2208, 2210 may be similar to the unilateral data sharing application described above with reference to FIG. 13. However, in these implementations, when a hook or trigger is detected as a predetermined condition in the voice communication channel 2206, such as a laugh, keywords, etc., as discussed above, then the applications are able to communicate data directly via the data communication channel 2218. Additionally, while the illustrated implementation shows the use an established data communication channel, in other implementations, single instance messages, as described above, may be used in place of the established data communication channel 2218. Further, as discussed above, the server computing device(s) 714 may alternatively, or additionally, detect the trigger in the conversation for delivering content to the telecommunications devices or for adding sound overlays to the voice channel. For example, when a particular word is detected, the server computing device(s) 714 can overlay a sound effect or jingle on the voice conversation, or deliver an image or other content to each the telecommunications devices.

Figure 23:
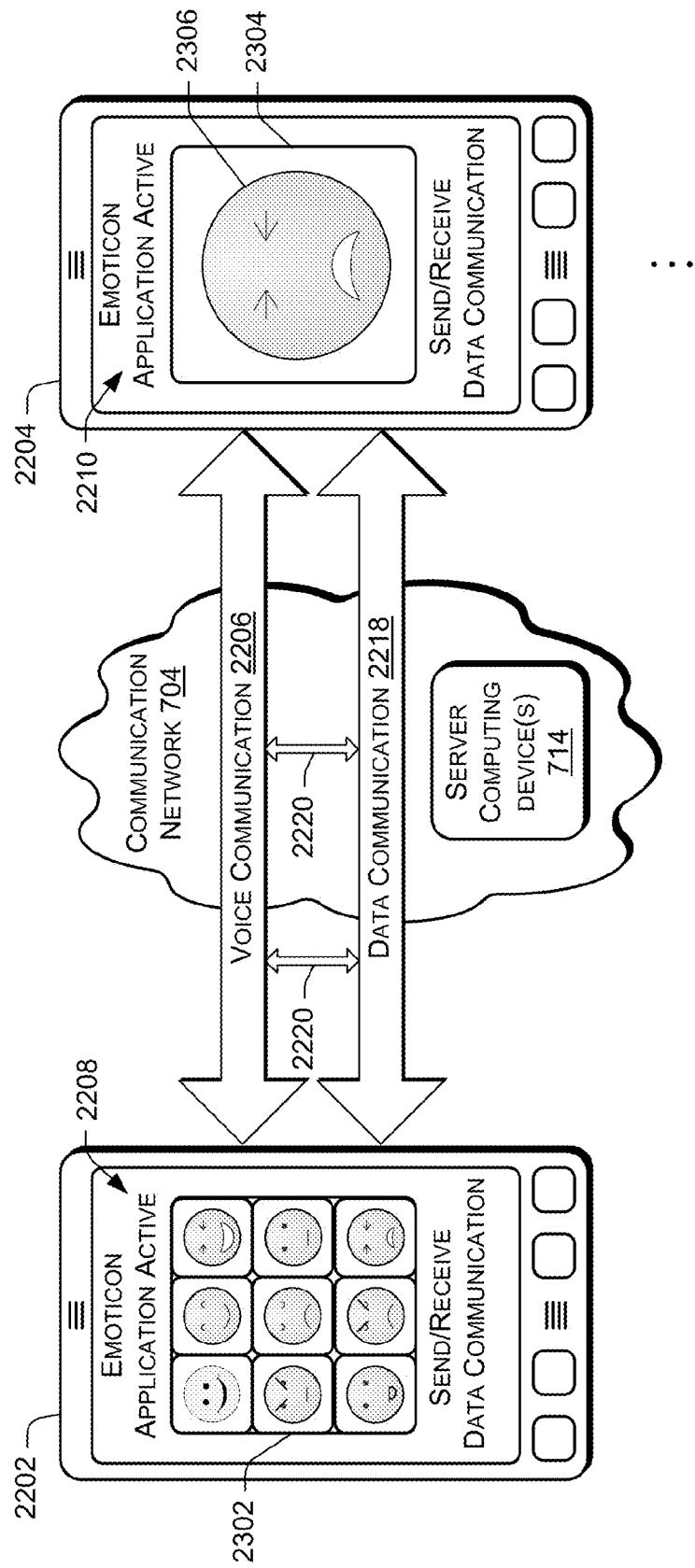
FIG. 23 illustrates another exemplary implementation of the additional implementations of bilateral shareable applications.

FIG. 23 illustrates an example of an implementation of a bilateral shareable application with voice channel interaction which enables a first user and the second user to exchange data in response to predetermined conditions detected in the voice communication channel. For example, the first telecommunications device 2320 may include a first user interface 2302 provided by the shareable application 2308, and second telecommunications device 2304 may include a second user interface 2304 provided by the shareable application 2310. When a predetermined condition is detected by either instance of the shareable applications 2308, 2310, an emoticon image 2306 may be transmitted from one of the telecommunications devices to the other and displayed on the respective user interface 2302, 2304. For example, if the user of the first telecommunications device groans, an image of an emoticon 2306 representing the user's emotion may be simultaneously displayed on the second telecommunications device. The emoticon image may be transmitted from the first telecommunications device to the second telecommunications device by the first sharable application 2308, or may be generated at the second telecommunications device by the second shareable application 2310. Additionally, while the illustrated implementation shows the use an established data communication channel, in other implementations, single instance messages, as described above, may be used in place of the established data communication channel 2318. In addition, the above-describe functions may alternatively or additionally be carried out by server computing device(s) 714 on the communication network 704.

Furthermore, various additional features may be implemented in the examples previously described above with respect to FIGS. 12-14 and 16-20 using the additional monitoring of the voice communication channel. For example, with respect to the photograph or slide presentation implementation of FIG. 17, the shareable applications may monitor the voice communication and automatically detect when the user has finished talking about a particular photograph or presentation slide and proceed to the next image in the photo group or slide deck. Similarly, with respect to the book reading implementation of FIG. 19, the application may monitor the voice communication and detect that the reader has reached the end of the page of the book and automatically display the next page in the book. Other variations will also be apparent to those of skill in the art in light of the disclosure provided herein.

Figure 24:
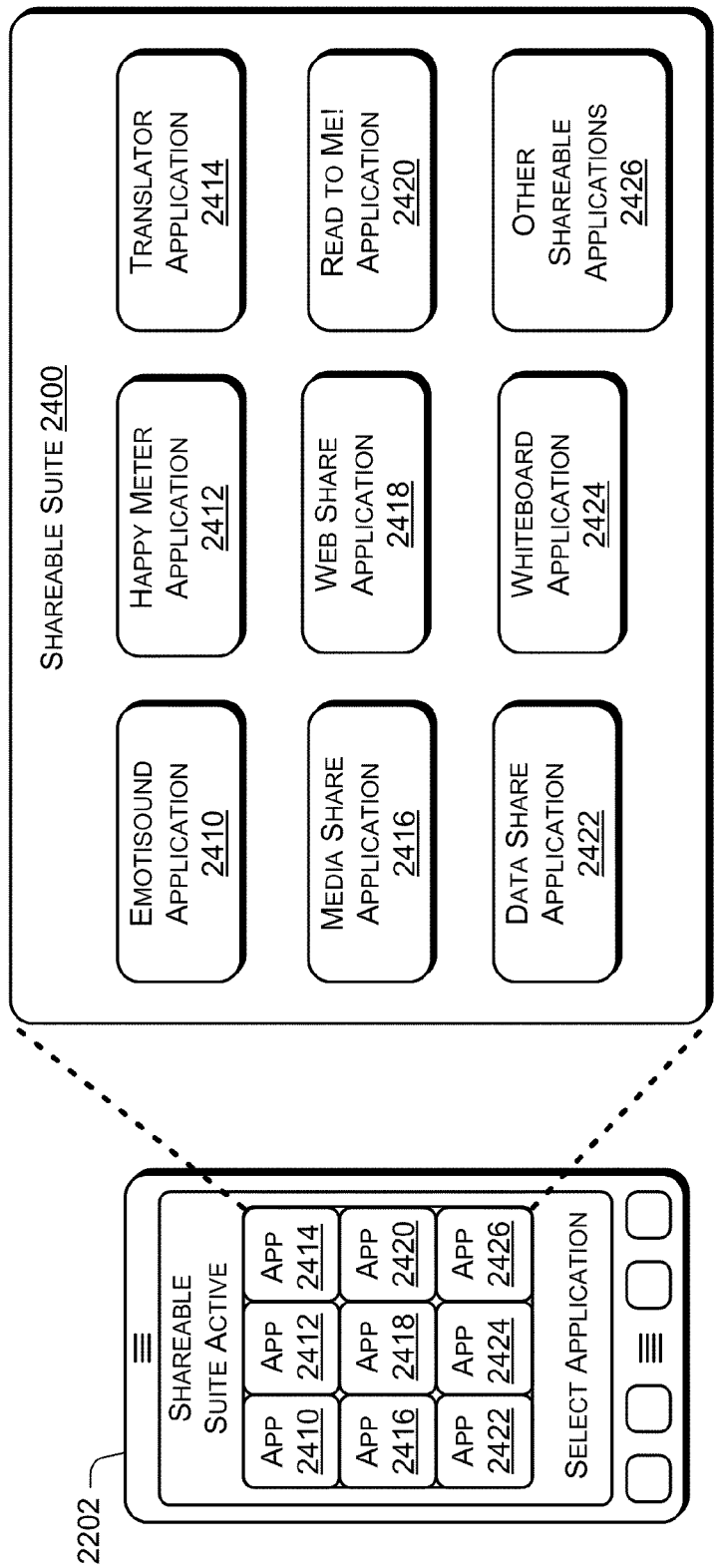
FIG. 24 illustrates an exemplary suite of shareable applications according to some implementations.

FIG. 24 illustrates management of the shareable applications on a telecommunication device as a suite 2400. For example, the shareable applications 2410-2426 described above may be packaged and managed as a suite 2400 that enables unitary purchasing, downloading, updating and the like of the shareable applications 2410-2426.

From the foregoing, it should be apparent that implementations herein provide applications, user interfaces, program modules, and the like for enabling transferring and sharing of data between telecommunications devices while carrying on a simultaneous voice communication on the telecommunications devices. In some implementations, one or more shareable applications on a telecommunications device are able to interact with the voice content of the conversation for carrying out one or more functions of the application in response to or as a result of detecting a predetermined condition in the voice communication. Furthermore, some implementations enable applications executing on each of the telecommunications devices interact with each other during a voice conversation and/or interact with the voice communication itself.

Implementations also relate to telecommunications devices selectively activated or reconfigured by one or more applications or programs when the program instructions are executed. Such applications or programs may be stored in one or more processor-readable or computer-readable storage mediums having processor-readable program code embodied therein. The processor-readable program code is implemented at least in part by one or more processors to perform functions of the implementations described herein. The one or more processor-readable storage mediums may include, but are not limited to magnetic disks, read-only memories, random access memories, solid-state devices and drives, memory cards, or any other type of medium suitable for storing electronic information, and may in some implementations be stored at a location remote from the one or more processors executing the one or more programs.

Further, it should be noted that the system configurations illustrated in FIGS. 7-9, 11-14, 16-20 and 22-24 are purely exemplary of systems in which the implementations may be provided, and the implementations are not limited to the particular hardware configurations illustrated. In the description, numerous details are set forth for purposes of explanation in order to provide a thorough understanding of the disclosure. However, it will be apparent to one skilled in the art that not all of these specific details are required.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    displaying an electronic book on a parent telecommunications device;
    accepting navigational inputs from a parent to navigate the electronic book while the parent is reading the electronic book aloud;
    recording the navigational inputs and the reading of the electronic book for later transmitting, wherein the recording includes time-stamping the navigational inputs in relation to the reading;
    receiving input on the parent telecommunications device directing that navigational control by a child at a child telecommunications device be disabled while the child telecommunications device plays the reading of the electronic book by the parent; and
    later transmitting the recorded reading of the electronic book, the navigational inputs, and an instruction to disable the navigational control by the child at the child telecommunications device to the child telecommunications device, the later transmitting occurring after the parent reading of the electronic book is completed.

2. A method as recited in claim 1, further comprising:
    transmitting the navigational inputs and the reading of the electronic book to a 3rd party's telecommunications device while transmitting the navigational inputs and the reading of the electronic book to the child telecommunications device.

3. A method as recited in claim 1, further comprising:
    transmitting the navigational inputs and the reading of the electronic book to a 3rd party's telecommunications device while transmitting the navigational inputs and the reading of the electronic book to the child telecommunications device; and
    causing the 3rd party's telecommunications device to play the reading of the electronic book on the 3rd party's telecommunications device while the 3rd party's telecommunications device synchronously navigates the electronic book on the 3rd party's telecommunications device in accordance with the navigational inputs.

4. A method as recited in claim 1, further comprising:
    transmitting the navigational inputs and the reading of the electronic book to a 3rd party's telecommunications device after transmitting the navigational inputs and the reading of the electronic book to the child telecommunications device.

5. A method as recited in claim 1, wherein the transmitting comprises:
    establishing a multi-party voice call between the parent telecommunications device, the child telecommunications device, and a 3rd party's telecommunications device;
    transmitting the reading of the electronic book over the multi-party voice call as the parent is reading the electronic book aloud.

6. A method as recited in claim 1, wherein the transmitting comprises:
    establishing a multi-party voice call between the parent telecommunications device, the child telecommunications device, and a 3rd party's telecommunications device;
    transmitting the reading of the electronic book over the multi-party voice call as the parent is reading the electronic book aloud; and
    transmitting the navigational inputs to the 3rd party's telecommunications device as the parent is reading the electronic book aloud.

7. A method comprising:
    receiving, by a child telecommunication device, reading of an electronic book over a connection between the child telecommunications device and a parent telecommunications device as a parent is reading the electronic book aloud;
    receiving, by the child telecommunication device, navigation signals over the connection as the parent is reading the electronic book aloud to navigate the electronic book on the child telecommunications device;
    receiving, by the child telecommunication device, an instruction from the parent telecommunication device to disable navigational control by a child at the child telecommunication device;
    displaying, by the child telecommunication device, the electronic book on the child telecommunications device during the reading, wherein the electronic book has interactive elements which are associated with parent utterances recorded at the parent telecommunications device;
    noting, by the child telecommunication device, interactions by the child with the interactive elements;
    playing, by the child telecommunication device, the parent utterances in response to the interactions; and
    while displaying the electronic book on the child telecommunications device during the reading, navigating through the electronic book in accordance with the received navigation signals and disabling navigational input by the child on the child telecommunication device.

8. A method as recited in claim 7, further comprising executing an electronic book viewer application on the child telecommunications device during the reading to display the electronic book.

9. A method as recited in claim 7, further comprising recording the reading and the navigational signals for later synchronized playback.

10. A method as recited in claim 7, further comprising recording the reading and the navigational signals for later transmission and synchronized playback on the child telecommunications device.

11. A child telecommunications device, comprising:
    wireless communications components capable of simultaneous voice and data communications with a parent telecommunications device, the wireless communication component receiving a voice call from the parent telecommunications device and participating in a data channel with the parent telecommunications device;
    a visual display; and
    a viewer module configured to:
        display an electronic book on the visual display during voice communication with the parent telecommunications device, the voice communication being received as part of the voice call,
        respond to navigational inputs from the parent telecommunications device during the voice communication to navigate the displayed electronic book while the parent reads the electronic book to the child by voice, the navigational inputs being received over the data channel, and based on instructions, disable navigational input by the child on the child telecommunication device during the voice communication, the instructions being received over the data channel, wherein the electronic book has interactive elements, the viewer module being further configured to associate the interactive elements with parent utterances recorded at the parent telecommunications and to play the parent utterances in response to interactions by the child with the interactive elements.

12. A child telecommunications device as recited in claim 10, further comprising a recording module configured to record the parent reading the electronic book to the child and to simultaneously record the navigational inputs from the parent telecommunications device for later synchronized playback.

13. A parent telecommunications device, comprising:

wireless communications components capable of simultaneous voice and data communications with a child telecommunications device, the wireless communication component making a voice call from to the child telecommunications device and participating in a data channel with the child telecommunications device;

a visual display;

a viewer module configured to:
- display an electronic book on the visual display during voice communication with the child telecommunications device, the voice communication being received as part of the voice call,
- receive navigational inputs from a parent during the voice communication,
- transmit the navigational inputs to the child telecommunications device over the data channel, and
- utilize the navigational inputs to navigate the electronic book on the parent telecommunications device and the child telecommunications device while the parent reads the electronic book to a child by voice; and a configuration button that enables the parent to enable or disable navigational control of the electronic book by the child on the child telecommunications device, wherein the electronic book has interactive elements, the viewer module being further configured to associate the interactive elements with parent utterances and to provide the parent utterances to the child device for playback in response to interaction with the interactive elements at the child device.

14. A parent telecommunications device as recited in claim 13, further comprising a recording module configured to record the parent reading the electronic book to the child and to simultaneously record the navigational inputs for later synchronized playback.

15. One or more non-transitory tangible computer-readable media containing instructions that are executable by a processor to perform actions comprising:

receiving, on a child telecommunications device, a parent reading of an electronic book and navigational inputs from a parent, wherein the electronic book has interactive elements which are associated with parent utterances recorded at the parent telecommunications device;

receiving, on the child telecommunication device, an instruction from the parent telecommunication device to disable navigational control by a child at the child telecommunication device;

displaying the electronic book on the child telecommunications device;

playing the parent reading of the displayed electronic book on the child telecommunications device;

while playing the parent reading of the displayed electronic book,
- synchronously navigating the electronic book on the child telecommunications device in accordance with the navigational inputs from the parent, and
- disabling navigational input by the child on the child telecommunication device;

noting interactions by the child with the interactive elements on the child telecommunication device; and playing the parent utterances in response to the interactions on the child telecommunication device.

16. One or more non-transitory tangible computer-readable media as recited in claim 15, the actions further comprising:

establishing a voice call with the parent telecommunications device; and receiving the parent reading over the voice call while the parent reads the displayed electronic book aloud.

17. One or more non-transitory tangible computer-readable media as recited in claim 15, the actions further comprising:

receiving the navigational inputs while the parent reads the displayed electronic book aloud to the child.

* * * * *